US012113557B2

(12) United States Patent
Hitomi et al.

(10) Patent No.: US 12,113,557 B2
(45) Date of Patent: *Oct. 8, 2024

(54) RADIO FREQUENCY MODULE AND COMMUNICATION DEVICE

(71) Applicant: MURATA MANUFACTURING CO., LTD., Kyoto (JP)

(72) Inventors: Shinya Hitomi, Nagaokakyo (JP); Yuichi Tannan, Nagaokakyo (JP); Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,099

(22) Filed: Jun. 12, 2023

(65) Prior Publication Data

US 2023/0327688 A1    Oct. 12, 2023

Related U.S. Application Data

(63) Continuation of application No. 17/660,641, filed on Apr. 26, 2022, now Pat. No. 11,722,159, which is a (Continued)

(30) Foreign Application Priority Data

Oct. 15, 2019 (JP) .................... 2019-188470

(51) Int. Cl.
   *H04B 1/00*     (2006.01)
   *H04B 1/16*     (2006.01)

(52) U.S. Cl.
   CPC .......... *H04B 1/0078* (2013.01); *H04B 1/006* (2013.01); *H04B 1/1615* (2013.01)

(58) Field of Classification Search
   CPC .... H04B 1/0078; H04B 1/006; H04B 1/1615; H04B 1/0064
   (Continued)

(56) References Cited

U.S. PATENT DOCUMENTS 9,712,196 B2   7/2017  Ripley et al.
11,349,508 B2  5/2022  Hitomi et al.
(Continued)

FOREIGN PATENT DOCUMENTS

JP    2006-128881 A    5/2006

OTHER PUBLICATIONS

NTT Docomo, Inc., Handling of Asynchronous Operation of DC_B42_n79, 3GPP TSG-RAN WG4 Meeting #90bis, Apr. 8-12, 2019, pp. 1-2, R4-1903556, Xian, China.

*Primary Examiner* — Tanmay K Shah
(74) *Attorney, Agent, or Firm* — Pearne & Gordon LLP

(57) ABSTRACT

A radio frequency module includes: a first filter circuit disposed on a first path that connects an antenna terminal and a first input/output terminal, and having a passband that is a first frequency band; a second filter circuit disposed on a second path that connects the antenna terminal and a second input/output terminal, and having a passband that is a second frequency band higher than the first frequency band; and a band-elimination filter circuit disposed on the second path and having an attenuation band that is a partial band of a third frequency band that belongs to an unlicensed band ranging from 5 GHz or higher, and is higher than the second frequency band. The second filter circuit is an LC filter circuit that includes an inductor and a capacitor.

17 Claims, 17 Drawing Sheets

Related U.S. Application Data continuation of application No. 17/066,772, filed on Oct. 9, 2020, now Pat. No. 11,349,508.

(58) Field of Classification Search
USPC ........................................................ 375/308
See application file for complete search history.

(56) References Cited

U.S. PATENT DOCUMENTS

| | | | |
|---|---|---|---|
| 2007/0161357 A1* | 7/2007 | Tudosoiu | H04B 1/0057 |
| | | | 455/78 |
| 2011/0045786 A1* | 2/2011 | Leinonen | H01Q 3/24 |
| | | | 455/78 |
| 2013/0154761 A1* | 6/2013 | Ilkov | H04B 1/006 |
| | | | 333/175 |
| 2014/0112213 A1* | 4/2014 | Norholm | H04B 1/56 |
| | | | 370/277 |
| 2019/0181907 A1* | 6/2019 | Pfann | H03H 9/542 |

* cited by examiner

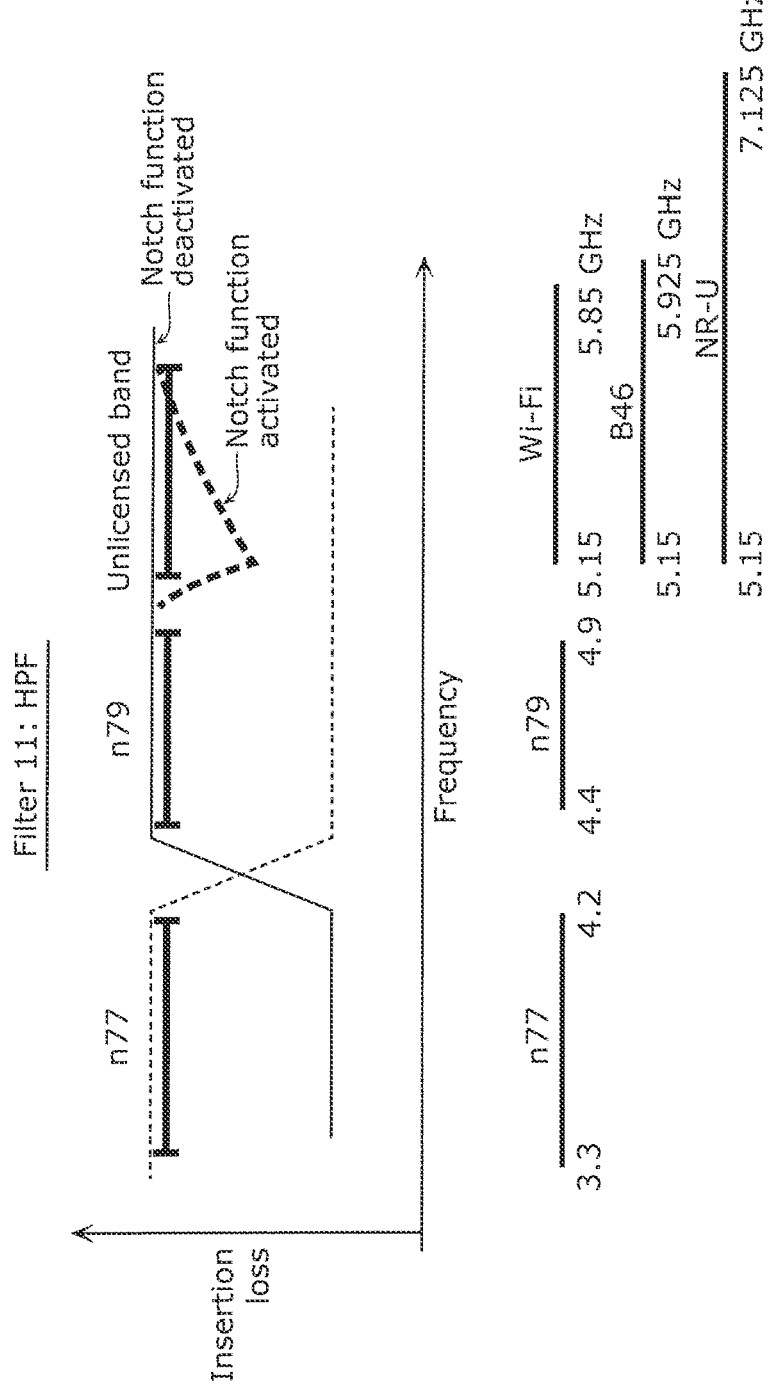

FIG. 6A
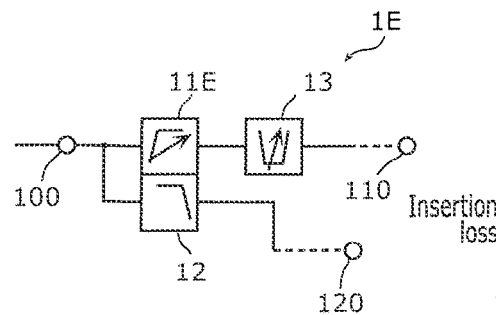
FIG. 6B
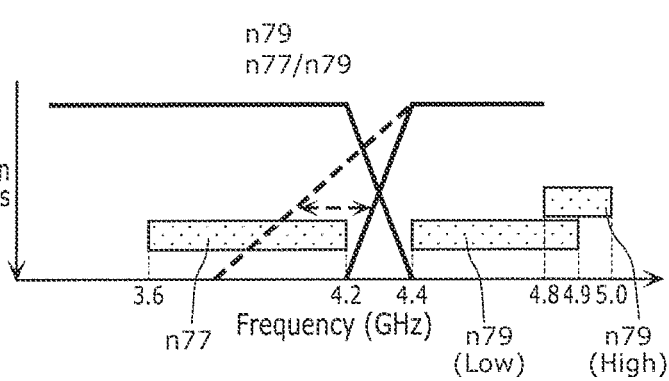
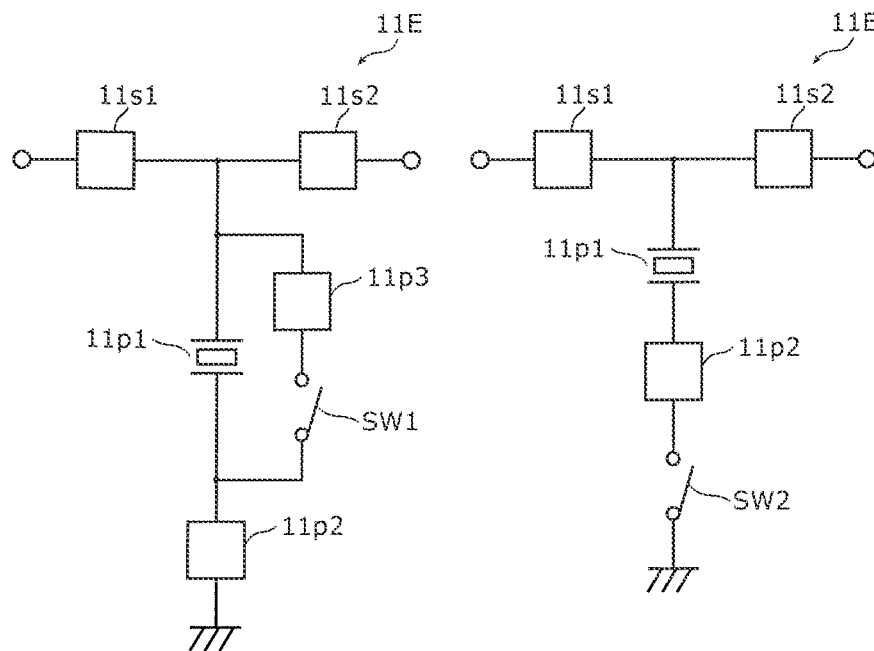
FIG. 6C
FIG. 6D

RADIO FREQUENCY MODULE AND COMMUNICATION DEVICE

CROSS REFERENCE TO RELATED APPLICATION

The present application is a continuation of U.S. patent application Ser. No. 17/660,641 filed on Apr. 26, 2022, which is a continuation of U.S. patent application Ser. No. 17/066,772 filed on Oct. 9, 2020, which claims priority of Japanese Patent Application No. 2019-188470 filed on Oct. 15, 2019. The entire disclosure of each of the above-identified applications, including the specification, drawings and claims is incorporated herein by reference in its entirety.

TECHNICAL FIELD

The present disclosure relates to a radio frequency module and a communication device.

BACKGROUND

In recent communication service, the width of a communication band is increased, and a plurality of communication bands are simultaneously used, in order to increase channel capacity and the speed of communication.

Japanese Unexamined Patent Application Publication No. 2006-128881 discloses a multiplexer that can demultiplex and multiplex radio frequency signals of two different communication bands. The multiplexer disclosed in Japanese Unexamined Patent Application Publication No. 2006-128881 includes an LC filter that includes an inductor and a capacitor. According to this, radio frequency signals of wide communication bands can be demultiplexed and multiplexed.

BRIEF SUMMARY

The Third Generation Partnership Project (3GPP) has defined simultaneous transfer of radio frequency signals of 5G-New Radio (NR) frequency bands such as n77 (from 3300 MHz to 4200 MHz), n78 (from 3300 MHz to 3800 MHz), and n79 (from 4400 MHz to 5000 MHz). Furthermore, when a 5G-NR radio frequency signal of such a band and a radio frequency signal of an unlicensed band that ranges from 5 GHz or higher and is close to the band are simultaneously transferred, it is necessary to maintain communication quality such as an isolation between the 5G-NR radio frequency signal and the radio frequency signal of the unlicensed band.

However, it is difficult to apply the LC filter described in Japanese Unexamined Patent Application Publication No. 2006-128881 as a diplexer that demultiplexes and multiplexes a 5G-NR signal of such a band and a signal of the unlicensed band that ranges from 5 GHz or higher and is close to the band. For example, an LC filter is suitable as a filter that passes a signal of a wide band such as n79, but is unsuitable for attenuating a signal of an adjacent band whose frequency interval to another band is relatively narrow. Furthermore, a filter that passes a signal of n79 also needs isolation between signals of n79 and n77 that has a lower frequency range than n79. Accordingly, the filter that passes a signal of n79 needs to attenuate both of a signal having a lower frequency range (n77) and a signal having a higher frequency range (the unlicensed band) than the passband. However, it is difficult for an LC filter to fully attenuate both of the signals having lower and higher frequency ranges than the passband, while ensuring a wide passband. On the other hand, (i) a band used for n79 varies among countries and (ii) a band used for the unlicensed band (for example, Wi-F (a registered trademark)) may not be close to n79 depending on a channel used, and thus communication quality may not deteriorate even if signals of such bands are simultaneously transferred. Specifically, a filter that passes a signal of n79 that is a wide frequency band needs to have optimized communication quality such as isolation and transfer loss, according to a state of simultaneously using the unlicensed band and n79 adjacent to each other.

In view of the above, the present disclosure has been conceived in order to solve the above-identified and other problems, and provides a radio frequency module and a communication device that can reduce deterioration of communication quality when a radio frequency signal of an unlicensed band ranging from 5 GHz or higher and a signal of a wide band adjacent to the unlicensed band are simultaneously used.

In order to provide such a radio frequency module, a radio frequency module according to an aspect of the present disclosure includes: an antenna terminal; a first input/output terminal; a second input/output terminal; a first filter circuit disposed on a first path and having a passband that is a first frequency band, the first path connecting the antenna terminal and the first input/output terminal; a second filter circuit disposed on a second path and having a passband that is a second frequency band higher than the first frequency band, the second path connecting the antenna terminal and the second input/output terminal; and a first band-elimination filter circuit disposed on the second path and having an attenuation band that is a partial band of a third frequency band belonging to an unlicensed band that ranges from 5 GHz or higher, the third frequency band being higher than the second frequency band. The second filter circuit is an LC filter circuit that includes an inductor and a capacitor.

According to the present disclosure, a radio frequency module and a communication device can be provided which can reduce deterioration of communication quality when a radio frequency signal of an unlicensed band ranging from 5 GHz or higher and a signal of a wide band adjacent to the unlicensed band are simultaneously used.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2A illustrates a first example of communication bands and filter passing characteristics applied to the radio frequency module according to Embodiment 1 and Variation 1.

FIGS. 6A to 6D illustrate circuit configurations of a radio frequency module according to Variation 6 of Embodiment 1.

DETAILED DESCRIPTION OF EMBODIMENTS

Figure 1A:
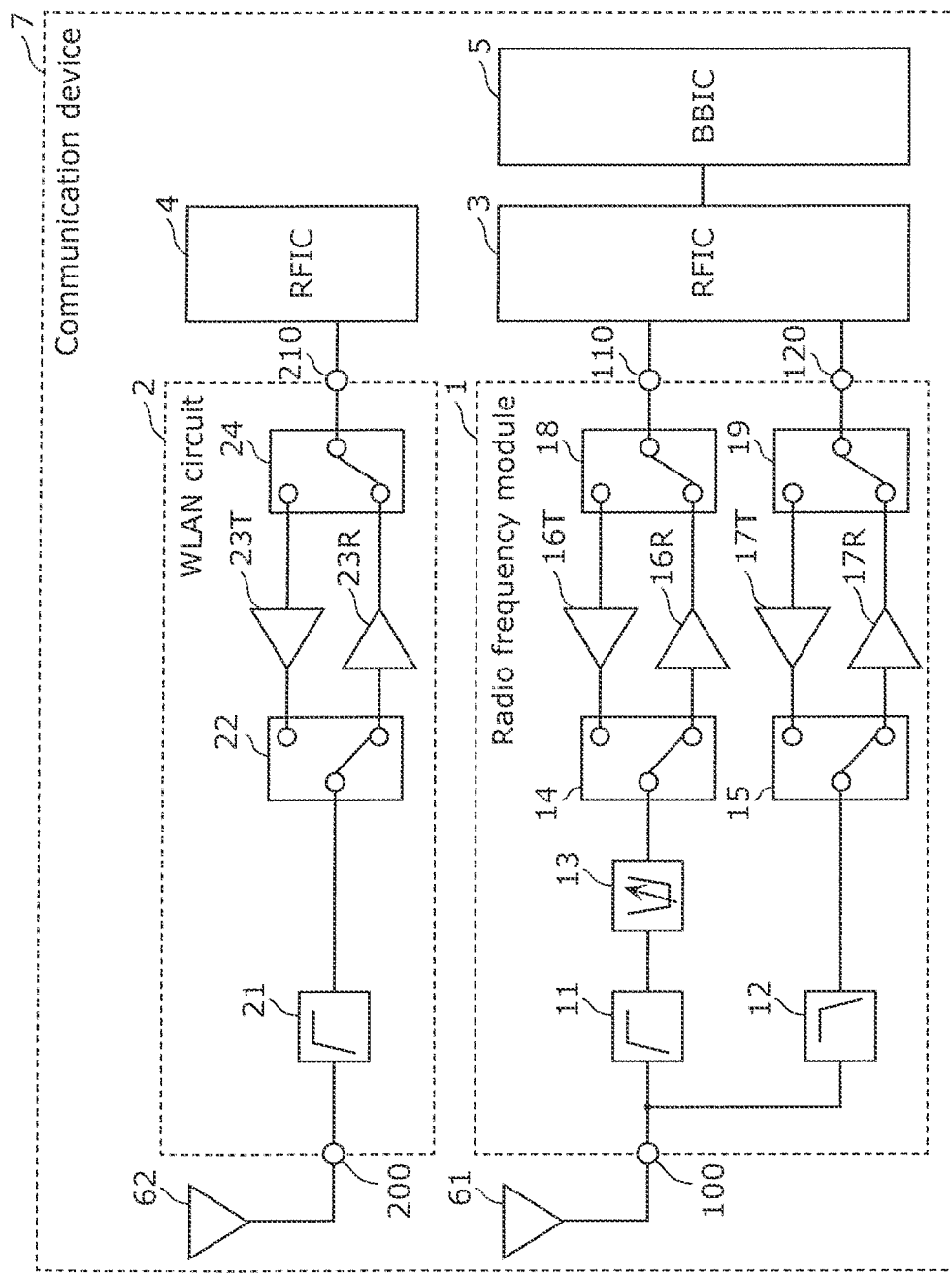
FIG. 1A illustrates a circuit configuration of a radio frequency module and a communication device according to Embodiment 1.

The following describes in detail the embodiments of the present disclosure, with reference to drawings. Note that the embodiments and variations described below each show a general or specific example. The numerical values, shapes, materials, elements, the arrangement and connection of the elements, and others indicated in the following embodiments and variations are mere examples, and therefore are not intended to limit the present disclosure. Thus, among the elements in the following embodiments and variations, elements not recited in any independent claim are described as arbitrary elements. In addition, the sizes of elements and the ratios of the sizes illustrated in the drawings are not necessarily accurate.

In the following, a "path" means a transfer route that includes, for instance, a line through which a radio frequency signal propagates, an electrode directly connected to the line, or a terminal directly connected to the line or the electrode.

Embodiment 1

1.1 Configuration of Radio Frequency Module 1 and Communication Device 7

FIG. 1A illustrates a circuit configuration of radio frequency module 1 and communication device 7 according to Embodiment 1. As illustrated in FIG. 1A, communication device 7 includes radio frequency module 1, wireless local-area network (WLAN) circuit 2, radio frequency (RF) signal processing circuits (RF integrated circuits (RFICs)) 3 and 4, baseband signal processing circuit (BB integrated circuit (BBIC)) 5, and antennas 61 and 62.

RFIC 3 is an RF signal processing circuit that processes radio frequency signals of a first frequency band and a second frequency band transmitted and received by antenna 61. Specifically, RFIC 3 processes a reception signal input through a reception path of radio frequency module 1 by down-conversion, for instance, and outputs a reception signal generated by being processed to BBIC 5. RFIC 3 processes a transmission signal input from BBIC 5 by up-conversion, for instance, and outputs a transmission signal generated by being processed to a transmission path of radio frequency module 1.

BBIC 5 is a circuit that processes signals using an intermediate frequency band lower than the frequency range of a radio frequency signal transferred in radio frequency module 1. A signal processed by BBIC 5 is used, for example, as an image signal for image display or as an audio signal for talk through a loudspeaker.

RFIC 4 is an RF signal processing circuit that processes radio frequency signals of a third frequency band transmitted and received by antenna 62. Specifically, RFIC 4 processes reception signals input through a reception path of WLAN circuit 2. RFIC 4 outputs transmission signals to a transmission path of WLAN circuit 2.

Antenna 61 radiates and receives radio frequency signals of the first frequency band and the second frequency band. Antenna 62 radiates and receives radio frequency signals of the third frequency band.

Note that in the present embodiment, the second frequency band corresponds to a communication band close to the lowest frequency of an unlicensed band ranging from 5 GHz or higher and is, for example, a communication band of 4G-Long Term Evolution (LTE®) or 5G-New Radio (NR). In particular, the second frequency band is, for example, n79 (4400 MHz to 5000 MHz) of 5G-NR having a narrow frequency interval to the unlicensed band.

In the present embodiment, the first frequency band corresponds to a communication band close to the lowest frequency of the second frequency band and is, for example, a 4G-LTE or 5G-NR communication band. In particular, the first frequency band is at least one of, for example, 5G-NR n77 (3300 MHz to 4200 MHz), 5G-NR n78 (3300 MHz to 3800 MHz), 5G-NR n42 (3400 MHz to 3600 MHz), 5G-NR n48 (3550 MHz to 3700 MHz), or 4G-LTE® B48 (3550 MHz to 3700 MHz).

In the present embodiment, the third frequency band corresponds to a communication band belonging to the unlicensed band ranging from 5 GHz or higher. The third frequency band is, for example, WLAN (Wi-Fi®): 5.15 GHz to 5.85 GHz), B46 (5.15 GHz to 5.925 GHz) of License-Assisted Access (LAA), or NR-U (5.15 GHz to 7.125 GHz).

Radio frequency module 1 includes antenna terminal 100, input/output terminals 110 and 120, filter circuits 11 and 12, band-elimination filter circuit 13, switches 14, 15, 18, and 19, transmission amplifiers 16T and 17T, and reception amplifiers 16R and 17R.

Antenna terminal 100 is connected to antenna 61.

Filter circuit 12 is an example of a first filter circuit, and is a filter disposed on a first path that connects antenna terminal 100 and input/output terminal 120 (a first input/output terminal), and having a passband that is a first frequency band.

Filter circuit 11 is an example of a second filter circuit, and is a filter disposed on a second path that connects antenna terminal 100 and input/output terminal 110 (a second input/output terminal), and having a passband that is a second frequency band higher than the first frequency band. Filter circuit 11 is a so-called LC filter that includes an inductor and a capacitor.

Band-elimination filter circuit 13 is an example of a first band-elimination filter circuit, and is a tunable band-elimination filter disposed on the second path, and having an attenuation band that is a partial band of a third frequency band that is higher than the second frequency band and belongs to the unlicensed band ranging from 5 GHz or higher. Specifically, band-elimination filter circuit 13 changes at least one of a frequency range or an amount of attenuation of the attenuation band.

Note that in radio frequency module 1 according to the present embodiment, filter circuits 11 and 12 are directly connected to antenna terminal 100. Specifically, filter circuits 11 and 12 are included in a diplexer that demultiplexes and multiplexes a radio frequency signal of the first frequency band and a radio frequency signal of the second frequency band. Accordingly, radio frequency module 1 is further miniaturized.

Note that filter circuits 11 and 12 do not need to be directly connected to antenna terminal 100. In this case, a switch may be disposed between antenna terminal 100 and filter circuits 11 and 12, which switches between the connection/disconnection of antenna terminal 100 to/from filter circuit 11 and switches between the connection/disconnection of antenna terminal 100 to/from filter circuit 12.

Transmission amplifier 16T is a power amplifier that amplifies a radio frequency signal of the second frequency band input via input/output terminal 110. Transmission amplifier 17T is a power amplifier that amplifies a radio frequency signal of the first frequency band input via input/output terminal 120.

Reception amplifier 16R is a low noise amplifier that amplifies a radio frequency signal of the second frequency band while noise is kept low, and outputs the amplified signal to input/output terminal 110. Reception amplifier 17R is a low noise amplifier that amplifies a radio frequency signal of the first frequency band while noise is kept low, and outputs the amplified signal to input/output terminal 120.

Switch 14 includes a common terminal and two selection terminals. The common terminal of switch 14 is connected to band-elimination filter circuit 13. Out of the selection terminals, one selection terminal of switch 14 is connected to transmission amplifier 16T, and the other selection terminal of switch 14 is connected to reception amplifier 16R. This connection configuration allows switch 14 to switch the connection of the common terminal between the one selection terminal and the other selection terminal. Specifically, switch 14 switches the connection of band-elimination filter circuit 13 between transmission amplifier 16T and reception amplifier 16R. Switch 14 includes a single pole double throw (SPDT) switch circuit, for example.

Switch 18 includes a common terminal and two selection terminals. The common terminal of switch 18 is connected to input/output terminal 110. Out of the selection terminals, one selection terminal of switch 18 is connected to transmission amplifier 16T, and the other selection terminal of switch 18 is connected to reception amplifier 16R. This connection configuration allows switch 18 to switch the connection of the common terminal between the one selection terminal and the other selection terminal. Specifically, switch 18 switches the connection of input/output terminal 110 between transmission amplifier 16T and reception amplifier 16R. Switch 18 includes an SPDT switch circuit, for example.

Switch 15 includes a common terminal and two selection terminals. The common terminal of switch 15 is connected to filter circuit 12. Out of the selection terminals, one selection terminal of switch 15 is connected to transmission amplifier 17T, and the other selection terminal of switch 15 is connected to reception amplifier 17R. This connection configuration allows switch 15 to switch the connection of the common terminal between the one selection terminal and the other selection terminal. Specifically, switch 15 switches the connection of filter circuit 12 between transmission amplifier 17T and reception amplifier 17R. Switch 15 includes an SPDT switch circuit, for example.

Switch 19 includes a common terminal and two selection terminals. The common terminal of switch 19 is connected to input/output terminal 120. Out of the selection terminals, one selection terminal of switch 19 is connected to transmission amplifier 17T, and the other selection terminal of switch 19 is connected to reception amplifier 17R. This connection configuration allows switch 19 to switch the connection of the common terminal between the one selection terminal and the other selection terminal. Specifically, switch 19 switches the connection of input/output terminal 120 between transmission amplifier 17T and reception amplifier 17R. Switch 19 includes an SPDT switch circuit, for example.

Synchronous switching of switches 14 and 18 allows the second path that connects antenna terminal 100 and input/output terminal 110 to convey a transmission signal and a reception signal of the second frequency band using the time division duplex (TDD) scheme.

Synchronous switching of switches 15 and 19 allows the first path that connects antenna terminal 100 and input/output terminal 120 to convey a transmission signal and a reception signal of the first frequency band using the TDD scheme.

Note that radio frequency module 1 may transfer radio frequency signals of the first frequency band and the second frequency band using the frequency division duplex (FDD) scheme.

Note that one of switches 14 and 18 may not be included. Furthermore, one of switches 15 and 19 may not be included.

WLAN circuit 2 includes antenna terminal 200, input/output terminal 210, filter circuit 21, switches 22 and 24, transmission amplifier 23T, and reception amplifier 23R.

Antenna terminal 200 is connected to antenna 62.

Filter circuit 21 is an example of a third filter circuit, and is a filter disposed on a path that connects antenna terminal 200 and input/output terminal 210, and has a passband that is the third frequency band.

Transmission amplifier 23T is a power amplifier that amplifies a radio frequency signal of the third frequency band input via input/output terminal 210. Reception amplifier 23R is a low noise amplifier that amplifies a radio frequency signal of the third frequency band while noise is kept low, and outputs the amplified signal to input/output terminal 210.

Switch 22 includes a common terminal and two selection terminals. The common terminal of switch 22 is connected to filter circuit 21. Out of the selection terminals, one selection terminal of switch 22 is connected to transmission amplifier 23T, and the other selection terminal of switch 22 is connected to reception amplifier 23R. This connection configuration allows switch 22 to switch the connection of the common terminal between the one selection terminal and the other selection terminal. Thus, switch 22 switches the connection of filter circuit 21 between transmission amplifier 23T and reception amplifier 23R. Switch 22 includes an SPDT switch circuit, for example.

Switch 24 includes a common terminal and two selection terminals. The common terminal of switch 24 is connected to input/output terminal 210. Out of the selection terminals, one selection terminal of switch 24 is connected to transmission amplifier 23T, and the other selection terminal of switch 24 is connected to reception amplifier 23R. This connection configuration allows switch 24 to switch the connection of the common terminal between the one selection terminal and the other selection terminal. Specifically, switch 24 switches the connection of input/output terminal 210 between transmission amplifier 23T and reception amplifier 23R. Switch 24 includes an SPDT switch circuit, for example.

Synchronous switching of switches 22 and 24 allows a path that connects antenna terminal 200 and input/output terminal 210 to convey a transmission signal and a reception signal of the third frequency band using the TDD scheme.

Note that WLAN circuit 2 may transfer a radio frequency signal of the third frequency band using the FDD scheme.

WLAN circuit 2 may be included in radio frequency module 1.

Note that one of switches 22 and 24 may not be included.

According to the configuration of radio frequency module 1 according to the present embodiment, an LC filter forms filter circuit 11 that passes a signal of the second frequency band close to the third frequency band belonging to the unlicensed band ranging from 5 GHz or higher, and thus the width of the passband of filter circuit 11 can be increased. Filter circuit 11 may have an attenuation band that is the first frequency band lower than the second frequency band. On the other hand, filter circuit 11 is an LC filter, and thus cannot sufficiently ensure the amount of attenuation of the third frequency band. To address this, band-elimination filter circuit 13 having an attenuation band that is a partial band of the third frequency band is disposed on the second path on which filter circuit 11 is disposed. According to whether a radio frequency signal of the second frequency band is used simultaneously with a radio frequency signal of the third frequency band, band-elimination filter circuit 13 changes at least one of the frequency range or the amount of attenuation of the third frequency band. Furthermore, according to a certain partial band of the third frequency band of radio frequency signals used simultaneously with radio frequency signals of the second frequency band, band-elimination filter circuit 13 changes at least one of the frequency range or the amount of attenuation of the certain partial band. Accordingly, a high isolation can be ensured according to the state of simultaneously using the second frequency band and the third frequency band close to each other. A circuit configuration that highly attenuates a signal of the third frequency band is not added to filter circuit 11, and low loss of the passband is ensured, so that when the second frequency band is not used simultaneously with the third frequency band, a transfer loss of a radio frequency signal of the second frequency band can be reduced by not allowing band-elimination filter circuit 13 to operate.

Accordingly, while filter circuit 11 reduces the transfer loss of the second frequency band, band-elimination filter circuit 13 can ensure the high isolation when a radio frequency signal of the second frequency band and a radio frequency signal of the unlicensed band ranging from 5 GHz or higher are simultaneously used. Thus, it is possible to provide radio frequency module 1 and communication device 7 that can reduce deterioration of communication quality when a radio frequency signal of the unlicensed band ranging from 5 GHz or higher and a signal of a wide band close to the unlicensed band are simultaneously used.

Note that filter circuit 11 includes one or more series-arm circuits disposed on the second path, for example. Band-elimination filter circuit 13 includes one or more series-arm circuits disposed on the second path, and one or more parallel-arm circuits, for example. Here, a capacitive series-arm circuit of filter circuit 11 and a capacitive series-arm circuit of the band-elimination filter circuit may be directly connected to each other. Note that even if the capacitive series-arm circuit of filter circuit 11 and the capacitive series-arm circuit of the band-elimination filter circuit are connected to each other via a switch, equivalent advantageous effects are yielded when the switch is conducting.

Accordingly, the impedance between filter circuit 11 and band-elimination filter circuit 13 can be readily matched, and a radio frequency signal of the second frequency band can be transferred through the second path while loss is kept low.

In radio frequency module 1 according to the present embodiment, the first path and the second path may be included in any of a reception circuit that only receives signals, a transmission circuit that only transmits signals, a transmission and reception circuit that transmits and also receives signals.

Figure 1B:
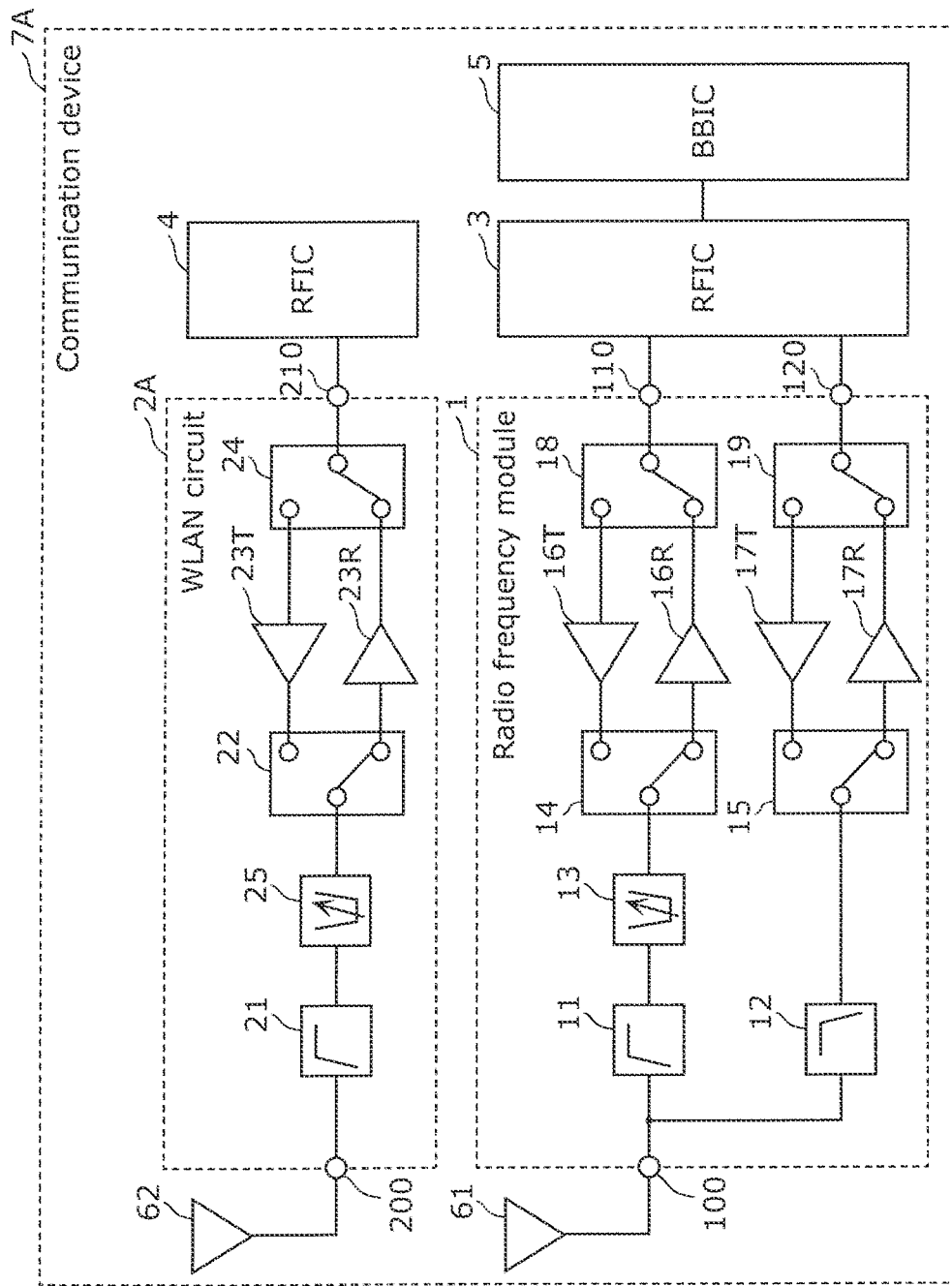
FIG. 1B illustrates a circuit configuration of the radio frequency module and a communication device according to Variation 1 of Embodiment 1.

FIG. 1B illustrates a circuit configuration of radio frequency module 1 and communication device 7A according to Variation 1 of Embodiment 1. As illustrated in FIG. 1B, communication device 7A includes radio frequency module 1, WLAN circuit 2A, RFICs 3 and 4, BBIC 5, and antennas 61 and 62. Communication device 7A according to this variation is different from communication device 7 according to Embodiment 1 in the configuration of WLAN circuit 2A. The following describes communication device 7A according to this variation, focusing on differences from communication device 7 according to Embodiment 1.

WLAN circuit 2A includes antenna terminal 200, input/output terminal 210, filter circuit 21, band-elimination filter circuit 25, switches 22 and 24, transmission amplifier 23T, and reception amplifier 23R.

Antenna terminal 200 is connected to antenna 62.

Filter circuit 21 is an example of a third filter circuit, and is a filter disposed on a third path that connects antenna terminal 200 and input/output terminal 210, and having a passband that is the third frequency band.

Band-elimination filter circuit 25 is an example of a second band-elimination filter circuit, and is a band-elimination filter disposed on a third path and having an attenuation band that is a partial band of the second frequency band. Band-elimination filter circuit 25 changes at least one of the frequency range or the amount of attenuation of the attenuation band.

Note that the frequency range and the amount of attenuation of the attenuation band may be fixed (alternatively, may not be changed) in band-elimination filter circuit 25.

Switch 22 includes a common terminal and two selection terminals. The common terminal of switch 22 is connected to band-elimination filter circuit 25. Out of the selection terminals, one selection terminal of switch 22 is connected to transmission amplifier 23T, and the other selection terminal of switch 22 is connected to reception amplifier 23R.

This connection configuration allows switch 22 to switch the connection of the common terminal between the one selection terminal and the other selection terminal. Specifically, switch 22 switches the connection of band-elimination filter circuit 25 between transmission amplifier 23T and reception amplifier 23R. Switch 22 includes an SPDT switch circuit, for example.

According to the configuration of WLAN circuit 2A according to this variation, band-elimination filter circuit 25 having an attenuation band that is a partial band of the second frequency band is disposed on the third path on which filter circuit 21 is disposed. According to whether a radio frequency signal of the third frequency band is used simultaneously with a radio frequency signal of the second frequency band, band-elimination filter circuit 25 changes at least one of the frequency range or the amount of attenuation of the second frequency band. Furthermore, according to a certain partial band of the second frequency band of a radio frequency signal used simultaneously with a radio frequency signal of the third frequency band, band-elimination filter circuit 25 changes at least one of the frequency range or the amount of attenuation of the certain partial band. Accordingly, a high isolation can be ensured according to the state of simultaneously using the third frequency band and the second frequency band close to each other. When the third frequency band is not used simultaneously with the second frequency band, transfer loss of a radio frequency signal of the third frequency band can be reduced by not allowing band-elimination filter circuit 25 to operate.

Note that WLAN circuit 2A may be included in radio frequency module 1.

Figure 2B:
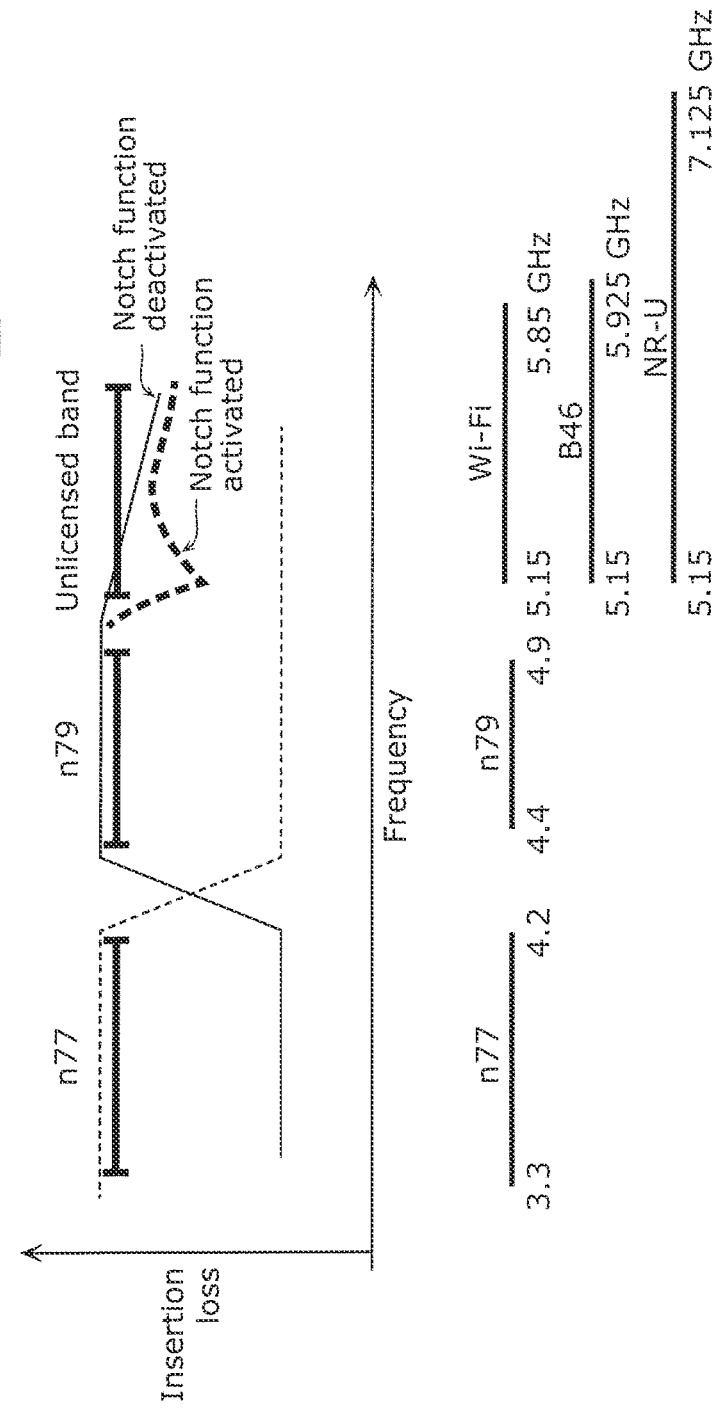
FIG. 2B illustrates a second example of communication bands and filter passing characteristics applied to the radio frequency module according to Embodiment 1 and Variation 1.

1.2 Communication Band and Filter Passing Characteristics Applied to Radio Frequency Module FIG. 2A illustrates a first example of communication bands and filter passing characteristics applied to radio frequency module 1 according to Embodiment 1 and Variation 1. Note that in the examples in FIGS. 2A to 2D, 5G-NR n77, for example, is applied as the first frequency band, 5G-NR n79, for example, is applied as the second frequency band, and one of WLAN (Wi-Fi®) of the unlicensed band, B46 of LAA, and NR-U, for example, is applied as the third frequency band.

In FIG. 2A, filter circuit 12 is a lowpass filter having a passband that is n77 (the first frequency band), an attenuation band that is n79 (the second frequency band), and an attenuation band that is the unlicensed band (the third frequency band). Filter circuit 11 is a highpass filter having a passband that is n79 and an attenuation band that is n77. Band-elimination filter circuit 13 is a filter circuit that changes between attenuating a signal of a partial band of the unlicensed band (activating the notch function) and not attenuating a signal of the partial band (deactivating the notch function).

Note that filter circuit 12 may be a bandpass filter having a passband that is n77 (the first frequency band), an attenuation band that is n79 (the second frequency band), and an attenuation band that is the unlicensed band (the third frequency band). Filter circuit 11 may be a bandpass filter having a passband that is n79 and an attenuation band that is n77. Band-elimination filter circuit 13 may not be a notch filter, and may be one of a highpass filter, a low pass filter, and a bandpass filter that attenuates a signal of a partial band of the unlicensed band.

Accordingly, when n79 and the unlicensed band close to each other are simultaneously used, high isolation between signals of n79 and the unlicensed band can be ensured by activating the notch function of band-elimination filter circuit 13. When the unlicensed band is not simultaneously used when n79 is used, the transfer loss of a radio frequency signal of n79 can be reduced by deactivating the notch function of band-elimination filter circuit 13.

Note that in WLAN circuit 2A according to Variation 1 of Embodiment 1, filter circuit 21 is a filter having a passband that is the unlicensed band, for example. Band-elimination filter circuit 25 is a filter circuit that changes between attenuating a signal of a partial band of n79 (activating the notch function) and not attenuating a signal of the partial band (deactivating the notch function).

Accordingly, when the unlicensed band and n79 close to each other are simultaneously used, a high isolation between signals of the unlicensed band and n79 can be ensured by activating the notch function of band-elimination filter circuit 25. When n79 is not simultaneously used when the unlicensed band is used, a transfer loss of a radio frequency signal of the unlicensed band can be reduced by deactivating the notch function of band-elimination filter circuit 25.

FIG. 2B illustrates a second example of communication bands and filter passing characteristics applied to radio frequency module 1 according to Embodiment 1 and Variation 1. In FIG. 2B, filter circuit 12 is a lowpass filter having a passband that is n77, an attenuation band that is n79, and an attenuation band that is the unlicensed band. Filter circuit 11 is a filter having a passband that is n79, an attenuation band that is n77, and an attenuation band that is the unlicensed band. Note that filter circuit 11 is an LC filter, and thus the amount of attenuation of the unlicensed band is smaller than the amount of attenuation of n77. Band-elimination filter circuit 13 changes between attenuating a signal of a partial band of the unlicensed band (activating the notch function) and not attenuating a signal of the partial band (deactivating the notch function).

Accordingly, when n79 and the unlicensed band close to each other are used simultaneously, the high isolation between n79 and the unlicensed band can be ensured by activating the notch function of band-elimination filter circuit 13. When the unlicensed band is not simultaneously used when n79 is used, the transfer loss of a radio frequency signal of n79 can be reduced by deactivating the notch function of band-elimination filter circuit 13. As compared with the passing characteristics illustrated in FIG. 2A, filter circuit 11 further attenuates signals of the unlicensed band, and thus when n79 and the unlicensed band are simultaneously used, the isolation between signals of n79 and the unlicensed band can be ensured more highly by deactivating the notch function of band-elimination filter circuit 13. On the other hand, filter circuit 11 attenuates a signal of the unlicensed band, and thus a transfer loss in the passband that is n79 is greater. Accordingly, when the unlicensed band is not simultaneously used when n79 is used, the transfer loss of a radio frequency signal of n79 can be reduced by deactivating the notch function of band-elimination filter circuit 13, but the transfer loss is greater as compared with the passing characteristics illustrated in FIG. 2A.

Figure 2C:
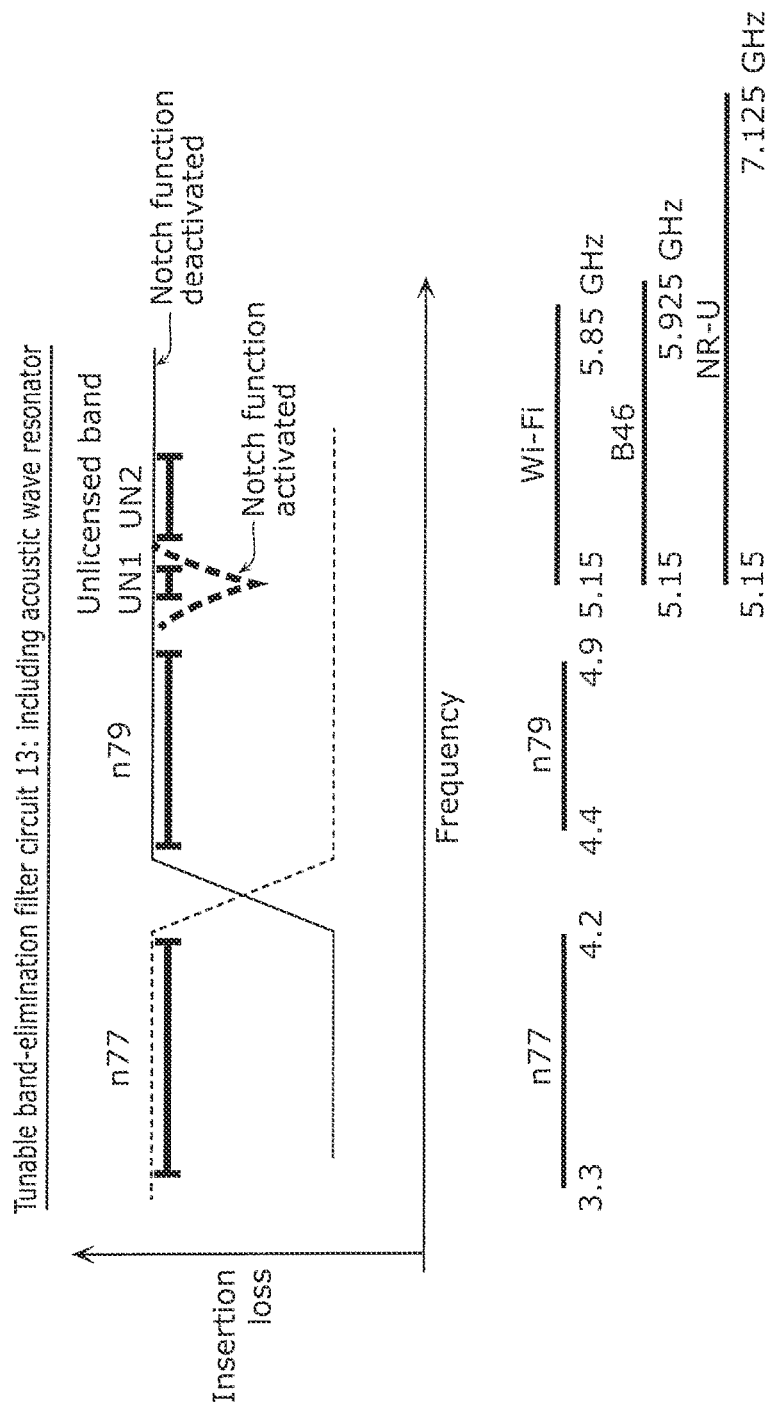
FIG. 2C illustrates a third example of communication bands and filter passing characteristics applied to the radio frequency module according to Embodiment 1 and Variation 1.

FIG. 2C illustrates a third example of communication bands and filter passing characteristics applied to radio frequency module 1 according to Embodiment 1 and Variation 1. In FIG. 2C, filter circuit 12 is a lowpass filter having a passband that is n77, an attenuation band that is n79, and an attenuation band that is the unlicensed band. Filter circuit 11 is a highpass filter having a passband that is n79 and an attenuation band that is n77. Out of UN1 (a third region) and UN2 (a fourth region) having a higher frequency range than UN1, which are partial bands of the unlicensed band, band-elimination filter circuit 13 changes between attenuating a signal of UN1 (activating the notch function) and not attenuating a signal of UN1 (deactivating the notch function).

Accordingly, when n79 and UN1 (the third region) of the unlicensed band close to each other are used simultaneously, the high isolation between signals of n79 and the unlicensed band can be ensured by activating the notch function of band-elimination filter circuit 13. When the unlicensed band is not simultaneously used when n79 is used, the transfer loss of a radio frequency signal of n79 can be reduced by deactivating the notch function of band-elimination filter circuit 13.

Note that in band-elimination filter circuit 13, when UN1 having a lower frequency range of the unlicensed band is an attenuation band, the frequency interval to n79 is relatively narrow, and thus the attenuation slope is to be made steep. Accordingly, band-elimination filter circuit 13 desirably includes an acoustic wave resonator having a high resonance Q factor.

Note that as the communication band applied to radio frequency module 1 according to Embodiment 1 and Variation 1, filter circuit 12 may be a lowpass filter having a passband that is NR-U (5.15 GHz to 5.35 GHz), an attenuation band that is NR-U (5.47 GHz to 5.85 GHz), and an attenuation band that is WLAN (5.925 GHz to 7.125 GHz). At this time, filter circuit 11 may be a highpass filter having a passband that is NR-U (5.47 GHz to 5.85 GHz) and an attenuation band that is NR-U (5.15 GHz to 5.35 GHz). At this time, band-elimination filter circuit 13 may change between attenuating a signal of at least a partial band of WLAN (5.925 GHz to 7.125 GHz) (activating the notch function) and not attenuating a signal of the partial band (deactivating the notch function).

As a communication band applied to radio frequency module 1 according to Embodiment 1 and Variation 1, filter circuit 12 may be a lowpass filter having a passband that is n77 or n79, an attenuation band that is NR-U (5.15 GHz to 5.85 GHz), and an attenuation band that is WLAN (5.925 GHz to 7.125 GHz). At this time, filter circuit 11 may be a highpass filter having a passband that is NR-U (5.15 GHz to 5.85 GHz), and an attenuation band that is n77 or n79. At this time, band-elimination filter circuit 13 may change between attenuating a signal of at least a partial band of WLAN (5.925 GHz to 7.125 GHz) (activating the notch function) and not attenuating a signal of the partial band (deactivating the notch function).

As a communication band applied to radio frequency module 1 according to Embodiment 1 and Variation 1, filter circuit 12 may be a lowpass filter having a passband that is n77 or n79, an attenuation band that is NR-U (5.15 GHz to 5.35 GHz), and an attenuation band that is WLAN (5.47 GHz to 5.85 GHz). At this time, filter circuit 11 may be a highpass filter having a passband that is NR-U (5.15 GHz to 5.35 GHz), and an attenuation band that is n77 or n79. Band-elimination filter circuit 13 may change between attenuating a signal of at least a partial band of WLAN (5.47 GHz to 5.85 GHz) (activating the notch function) and not attenuating a signal of the partial band (deactivating the notch function).

Figure 2D:
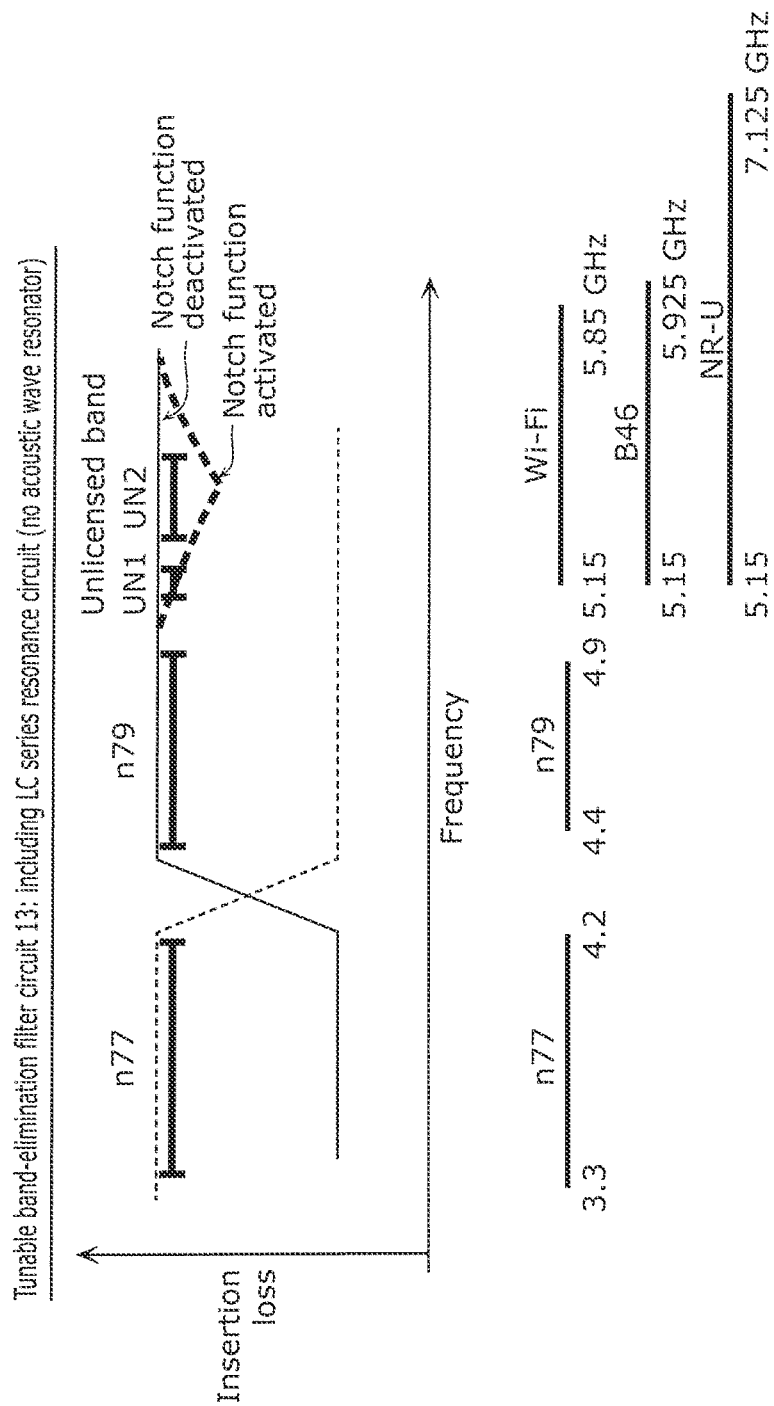
FIG. 2D illustrates a fourth example of communication bands and filter passing characteristics applied to the radio frequency module according to Embodiment 1 and Variation 1.

FIG. 2D illustrates a fourth example of communication bands and filter passing characteristics applied to radio frequency module 1 according to Embodiment 1 and Variation 1. In FIG. 2D, filter circuit 12 is a lowpass filter having a passband that is n77, an attenuation band that is n79, and an attenuation band that is the unlicensed band. Filter circuit 11 is a highpass filter having a passband that is n79, and an attenuation band that is n77. Out of UN1 (the third region) and UN2 (the fourth region) having a higher frequency range than UN1, which are partial bands of the unlicensed band, band-elimination filter circuit 13 changes between attenuating a signal of UN2 (activating the notch function) and not attenuating a signal of UN2 (deactivating the notch function).

Accordingly, when n79 and UN2 (the fourth region) of the unlicensed band close to each other are used simultaneously, the high isolation between signals of n79 and the unlicensed band can be ensured by activating the notch function of band-elimination filter circuit 13. When the unlicensed band is not simultaneously used when n79 is used, the transfer loss of a radio frequency signal of n79 can be reduced by deactivating the notch function of band-elimination filter circuit 13.

Note that in band-elimination filter circuit 13, when UN2 having a higher frequency range of the unlicensed band is an attenuation band, the frequency interval to n79 is relatively wide as compared with UN1, and thus the attenuation slope may be made relatively gentle. Accordingly, band-elimination filter circuit 13 may not include an acoustic wave resonator. Moreover, when an acoustic wave resonator is not included, the attenuation slope is gentle, yet a wide attenuation band can be ensured.

1.3 Example of Configuration of Band-Elimination Filter Circuit

Figure 3A:
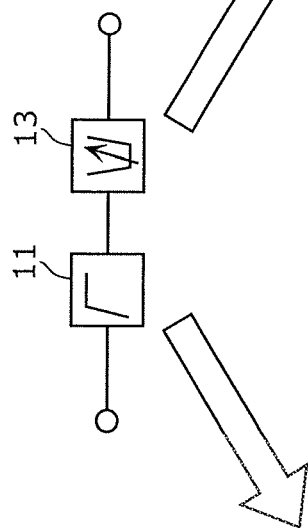
FIGS. 3A to 3C illustrate a first example of configurations of a band-elimination filter circuit according to Embodiment 1.
Figure 3C:
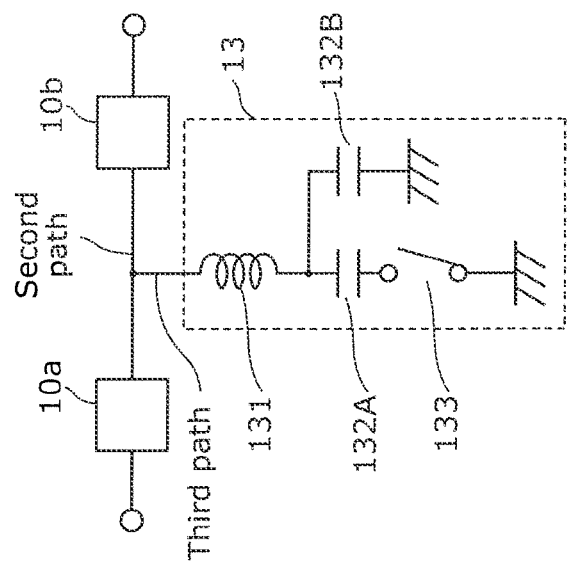
Figure 3B:
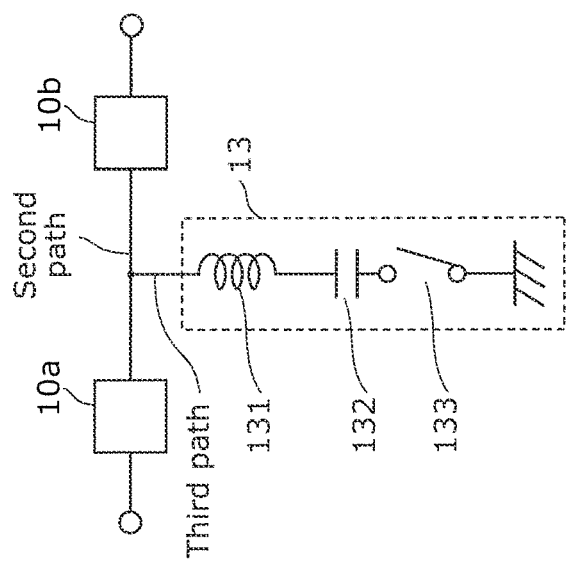

FIGS. 3A to 3C illustrate a first example of a configuration of band-elimination filter circuit 13 according to Embodiment 1. As illustrated in FIG. 3B, band-elimination filter circuit 13 includes inductor 131 and capacitor 132 connected in series to a ground path that connects the ground and the second path that connects antenna terminal 100 and input/output terminal 110, and switch 133 (a third switch) disposed on the ground path. Inductor 131 and capacitor 132 form an LC series resonance circuit disposed on the ground path that is a parallel arm.

According to the above configuration, an impedance local minimum point of the LC series resonance circuit is an attenuation pole, a signal of a partial band of the third frequency band is attenuated by placing switch 133 into the conducting state, and a signal of the partial band of the third frequency band is not attenuated by placing switch 133 into the non-conducting state.

Note that in FIG. 3B, filter circuit 11 includes series-arm circuits 10a and 10b disposed on the second path, inductor 131 and capacitor 132 connected in series to the ground path, and switch 133 disposed on the ground path. Thus, band-elimination filter circuit 13 is a portion of filter circuit 11. Note that band-elimination filter circuit 13 may be included in a circuit separate from filter circuit 11.

As illustrated in FIG. 3C, band-elimination filter circuit 13 includes inductor 131 and capacitor 132A connected in series to a ground path that connects the ground and the second path that connects antenna terminal 100 and input/ output terminal 110, capacitor 132B connected between the ground and a connecting point of inductor 131 and capacitor 132A, and switch 133 (a third switch) disposed on the ground path. When switch 133 is conducting, inductor 131 and a parallel combined circuit of capacitors 132A and 132B form a first LC series resonance circuit disposed on the ground path that is a parallel arm. When switch 133 is non-conducting, inductor 131 and capacitor 132B form a second LC series resonance circuit disposed on the ground path that is a parallel arm. Here, a resonance frequency of the first LC series resonance circuit is different from a resonance frequency of the second LC series resonance circuit.

According to the above configuration, the impedance local minimum point of the first LC series resonance circuit is an attenuation pole when switch 133 is conducting, and thus a signal of a first region of the third frequency band can be attenuated, whereas the impedance local minimum point of the second LC series resonance circuit is an attenuation pole when switch 133 is non-conducting, and thus a signal of a second region of the third frequency band different from the first region can be attenuated.

Note that in FIG. 3C, filter circuit 11 includes series-arm circuits 10a and 10b disposed on the second path, inductor 131 and capacitor 132A connected in series to the ground path, capacitor 132B connected between the ground and a connecting point of inductor 131 and capacitor 132A, and switch 133 disposed on the ground path. Thus, band-elimination filter circuit 13 is a portion of filter circuit 11. Note that band-elimination filter circuit 13 may be included in a circuit separate from filter circuit 11.

Thus, band-elimination filter circuit 13 illustrated in FIG. 3B changes the amount of attenuation of an attenuation band, and band-elimination filter circuit 13 illustrated in FIG. 3C can change the frequency range of an attenuation band.

Note that a circuit configuration of band-elimination filter circuit 13 illustrated in FIG. 3B is applied to the passing characteristics illustrated in FIG. 2D. Thus, the third frequency band belonging to the unlicensed band includes UN1 (the third region) and UN2 (the fourth region), and when a radio frequency signal of n79 (the second frequency band) and a radio frequency signal of UN2 (the fourth region) are simultaneously transferred, switch 133 connects the second path, inductor 131, capacitor 132, and the ground.

Accordingly, when n79 and UN2 (the fourth region) of the unlicensed band close to each other are simultaneously used, the high isolation between signals of n79 and the unlicensed band can be ensured by placing switch 133 into the conducting state. When the unlicensed band is not simultaneously used when n79 is used, the transfer loss of a radio frequency signal of n79 can be reduced by placing switch 133 into the non-conducting state. Note that when UN2 having a higher frequency range of the unlicensed band is an attenuation band, the frequency interval to n79 is relatively wide as compared with UN1, and thus band-elimination filter circuit 13 may not include an acoustic wave resonator.

In band-elimination filter circuit 13 illustrated in FIG. 3B, a circuit configuration in which an acoustic wave resonator is disposed instead of inductor 131 and capacitor 132 is applied to passing characteristics illustrated in FIG. 2C. Thus, the third frequency band belonging to the unlicensed band includes UN1 (the third region) and UN2 (the fourth region), and when a radio frequency signal of n79 (the second frequency band) and a radio frequency signal of UN1 (the third region) are simultaneously transferred, switch 133 connects the second path, the acoustic wave resonator, and the ground.

Accordingly, when n79 and UN1 (the third region) of the unlicensed band close to each other are simultaneously used, the high isolation between signals of n79 and the unlicensed band can be ensured by placing switch 133 (the fourth switch) into the conducting state. When the unlicensed band is not simultaneously used when n79 is used, the transfer loss of a radio frequency signal of n79 can be reduced by placing switch 133 into the non-conducting state. Note that when UN1 having a lower frequency range of the unlicensed band is an attenuation band, the frequency interval to n79 is relatively narrow, and thus the attenuation slope is to be made steep. Accordingly, band-elimination filter circuit 13 includes an acoustic wave resonator having a high resonance Q factor.

Figure 4A:
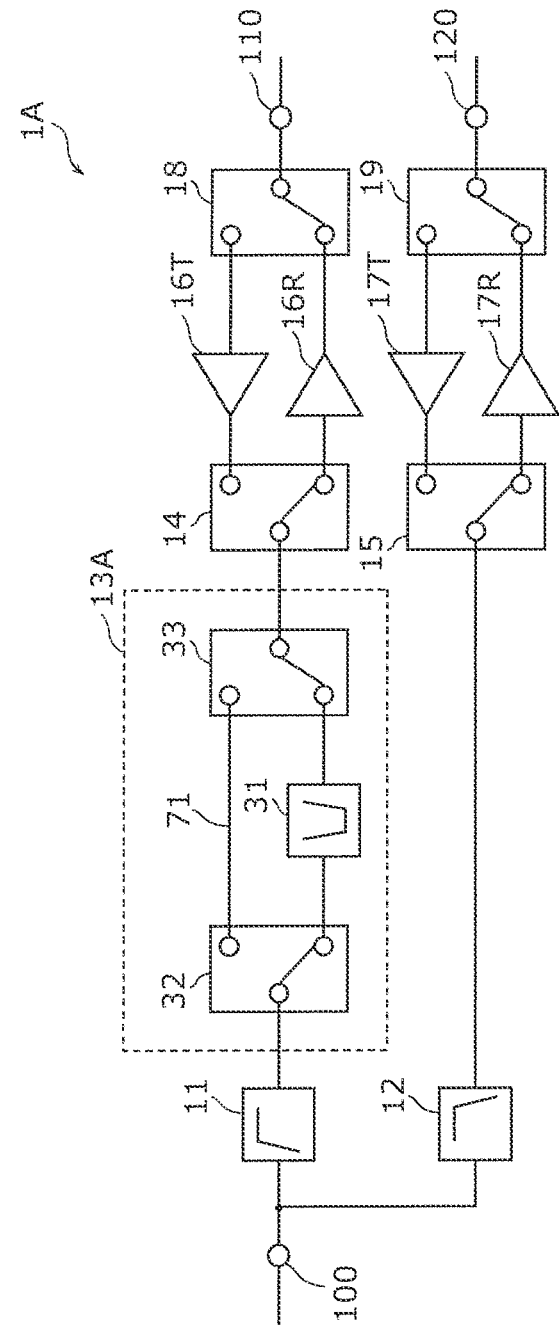
FIG. 4A illustrates a circuit configuration of a radio frequency module according to Variation 2 of Embodiment 1.

FIG. 4A illustrates a circuit configuration of radio frequency module 1A according to Variation 2 of Embodiment 1. As illustrated in FIG. 4A, radio frequency module 1A includes antenna terminal 100, input/output terminals 110 and 120, filter circuits 11 and 12, band-elimination filter circuit 13A, switches 14, 15, 18, and 19, transmission amplifiers 16T and 17T, and reception amplifiers 16R and 17R. Radio frequency module 1A according to this variation is different from radio frequency module 1 according to the embodiment, only in the configuration of band-elimination filter circuit 13A. Accordingly, the following describes radio frequency module 1A according to this variation, focusing on the configuration of band-elimination filter circuit 13A.

Band-elimination filter circuit 13A is an example of a first band-elimination filter circuit, and includes band-elimination filter 31 and switches 32 and 33.

Band-elimination filter 31 is an example of a first band-elimination filter, and is an attenuation-band fixed filter having an attenuation band that is a partial band of the third frequency band.

Each of switches 32 and 33 is an example of the first switch, and includes a common terminal and two selection terminals. The common terminal of switch 32 is connected to filter circuit 11, one selection terminal out of the selection terminals of switch 32 is connected to bypass path 71 that connects antenna terminal 100 and input/output terminal 110 and bypasses band-elimination filter 31, and the other selection terminal of switch 32 is connected to band-elimination filter 31. The common terminal of switch 33 is connected to switch 14, one selection terminal out of the selection terminals of switch 33 is connected to bypass path 71, and the other selection terminal of switch 33 is connected to band-elimination filter 31. This configuration allows switches 32 and 33 to switch the connection of antenna terminal 100 between bypass path 71 and band-elimination filter 31. Note that at least one of switch 32 or 33 may be disposed as the first switch.

According to the configuration of band-elimination filter circuit 13A, band-elimination filter 1A functions as a filter circuit that changes between attenuating a signal of a partial band of the unlicensed band (activating the notch function) and not attenuating a signal of the partial band (deactivating the notch function).

Figure 4B:
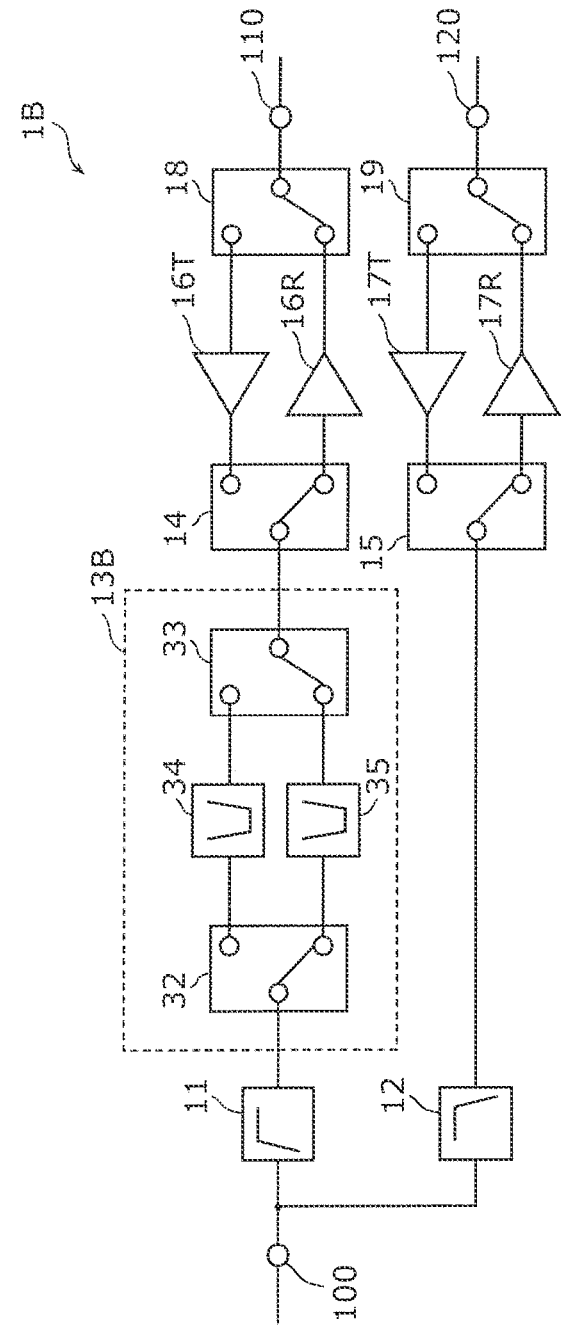
FIG. 4B illustrates a circuit configuration of a radio frequency module according to Variation 3 of Embodiment 1.

FIG. 4B illustrates a circuit configuration of radio frequency module 1B according to Variation 3 of Embodiment 1. As illustrated in FIG. 4B, radio frequency module 1B includes antenna terminal 100, input/output terminals 110 and 120, filter circuits 11 and 12, band-elimination filter circuit 13B, switches 14, 15, 18, and 19, transmission amplifiers 16T and 17T, and reception amplifiers 16R and 17R. Radio frequency module 1B according to this variation is different from radio frequency module 1 according to the embodiment, only in the configuration of band-elimination filter circuit 13B. Accordingly, the following describes radio frequency module 1B according to this variation, focusing on the configuration of band-elimination filter circuit 13B.

Band-elimination filter circuit 13B is an example of a first band-elimination filter circuit, and includes band-elimination filters 34 and 35 and switches 32 and 33.

Band-elimination filter 34 is an example of a second band-elimination filter having an attenuation band that is the first region belonging to the third frequency band, and is an attenuation-band fixed filter. Band-elimination filter 35 is an example of a third band-elimination filter having an attenuation band that is the second region belonging to the third frequency band, and is an attenuation-band fixed filter. Note that frequency ranges of the first region and the second region are different.

Each of switches 32 and 33 is an example of a second switch, and includes a common terminal and two selection terminals. The common terminal of switch 32 is connected to filter circuit 11, one of the selection terminals of switch 32 is connected to band-elimination filter 34, and the other selection terminal of switch 32 is connected to band-elimination filter 35. The common terminal of switch 33 is connected to switch 14, one of the selection terminals of switch 33 is connected to band-elimination filter 34, and the other selection terminal of switch 33 is connected to band-elimination filter 35. This configuration allows switches 32 and 33 to switch the connection of antenna terminal 100 between band-elimination filter 34 and band-elimination filter 35. Note that at least one of switch 32 or 33 may be disposed as the second switch.

According to the configuration of band-elimination filter circuit 13B, radio frequency module 1B functions as a filter circuit that changes the frequency range of the attenuation band in the unlicensed band.

Figure 4C:
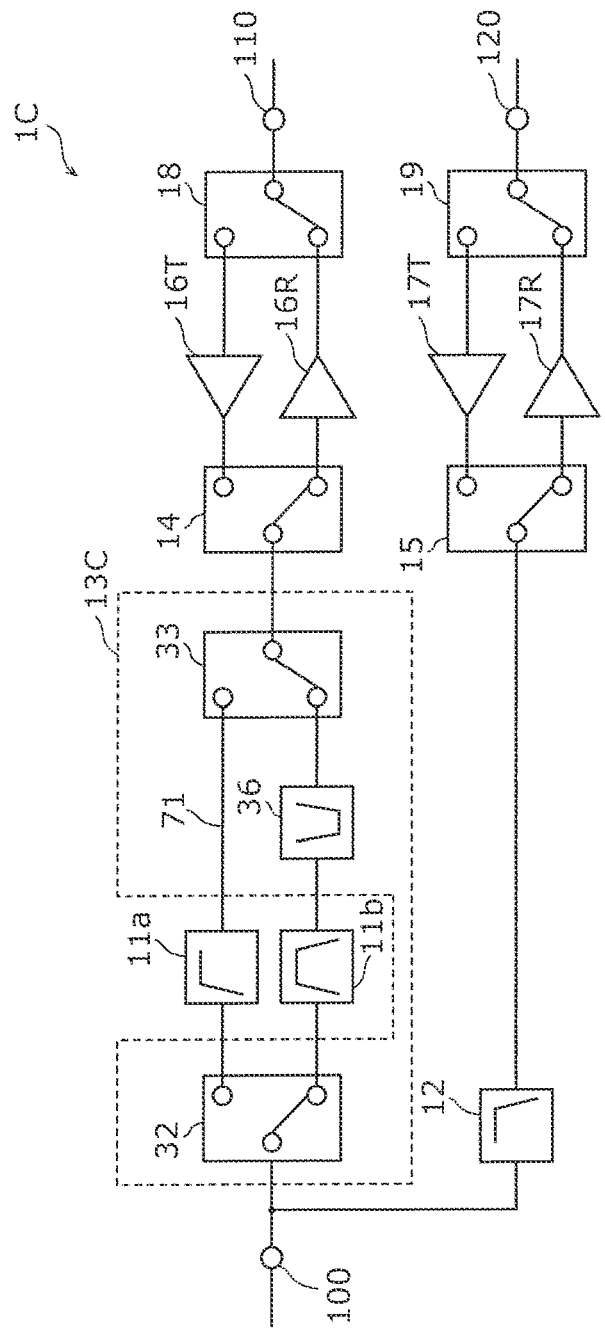
FIG. 4C illustrates a circuit configuration of a radio frequency module according to Variation 4 of Embodiment 1.

FIG. 4C illustrates a circuit configuration of radio frequency module 1C according to Variation 4 of Embodiment 1. As illustrated in FIG. 4C, radio frequency module 1C includes antenna terminal 100, input/output terminals 110 and 120, filter circuits 11a, 11b, and 12, band-elimination filter circuit 13C, switches 14, 15, 18, and 19, transmission amplifiers 16T and 17T, and reception amplifiers 16R and 17R. Radio frequency module 1C according to this variation is different from radio frequency module 1 according to the embodiment, in the configurations of filter circuits 11a and 11b and band-elimination filter circuit 13C. Accordingly, the following describes radio frequency module 1C according to this variation, focusing on the configurations of filter circuits 11a and 11b and band-elimination filter circuit 13C.

Band-elimination filter circuit 13C is an example of a first band-elimination filter circuit, and includes band-elimination filter 36 and switches 32 and 33.

Band-elimination filter 36 is an example of a first band-elimination filter, and is an attenuation-band fixed filter having an attenuation band that is a partial band of the third frequency band.

Each of switches 32 and 33 is an example of a first switch, and includes a common terminal and two selection terminals. The common terminal of switch 32 is connected to antenna terminal 100, one of the selection terminals of switch 32 is connected to filter circuit 11a, and the other selection terminal of switch 32 is connected to filter circuit 11b. The common terminal of switch 33 is connected to switch 14, one of the selection terminals of switch 33 is connected to bypass path 71 that connects antenna terminal 100 and input/output terminal 110 and bypasses band-elimination filter 31, and the other selection terminal of switch 33 is connected to band-elimination filter 36. This configuration allows switches 32 and 33 to switch the connection of antenna terminal 100 between bypasses path 71 and band-elimination filter 36. Note that at least one of switch 32 or 33 may be disposed as the first switch.

Filter circuit 11a is an example of a second filter circuit, and is a highpass filter that is disposed between switch 32 and switch 33, is connected to bypass path 71, and attenuates a signal of the first frequency band. Filter circuit 11b is an example of a second filter circuit, and is a band pass filter that is connected between switch 32 and band-elimination filter 36, and attenuates a signal of the first frequency band and a signal of the third frequency band. Filter circuit 11a attenuates only a signal of a lower frequency range than the passband, and filter circuit 11b attenuates both of a signal of a lower frequency range and a signal of a higher frequency range than the passband, and thus insertion loss in the passband of filter circuit 11a is smaller than that of filter circuit 11b.

According to the configuration of band-elimination filter circuit 13C, radio frequency module 1C functions as a filter circuit that changes between attenuating a signal of a partial band of the unlicensed band (activating the notch function) and not attenuating a signal of the partial band (deactivating the notch function). When a radio frequency signal of the second frequency band and a radio frequency signal of a partial band of the third frequency band are simultaneously used, the signals pass through high-attenuation filter circuit 11b operating as the second filter circuit, and thus the amount of attenuation of the partial band can be increased. On the other hand, when a radio frequency signal of the second frequency band is used, and a radio frequency signal of a partial band of the third frequency band is not used, the signals pass through low-loss filter circuit 11a operating as the second filter circuit, and thus a transfer loss of a radio frequency signal of the second frequency band can be decreased.

1.4 Example of Configuration of First Filter Circuit and Second Filter Circuit

Figure 5A:
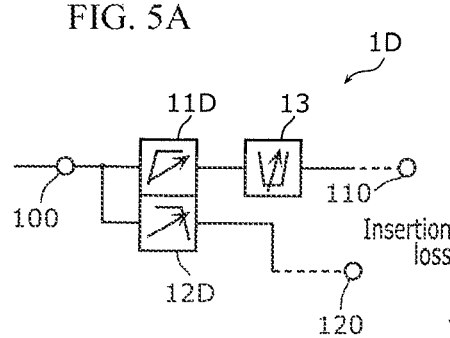
FIGS. 5A to 5C illustrate a circuit configuration of a radio frequency module according to Variation 5 of Embodiment 1.
Figure 5B:
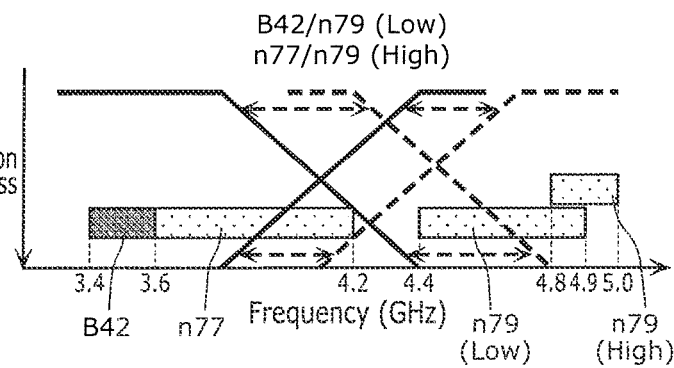
Figure 5C:
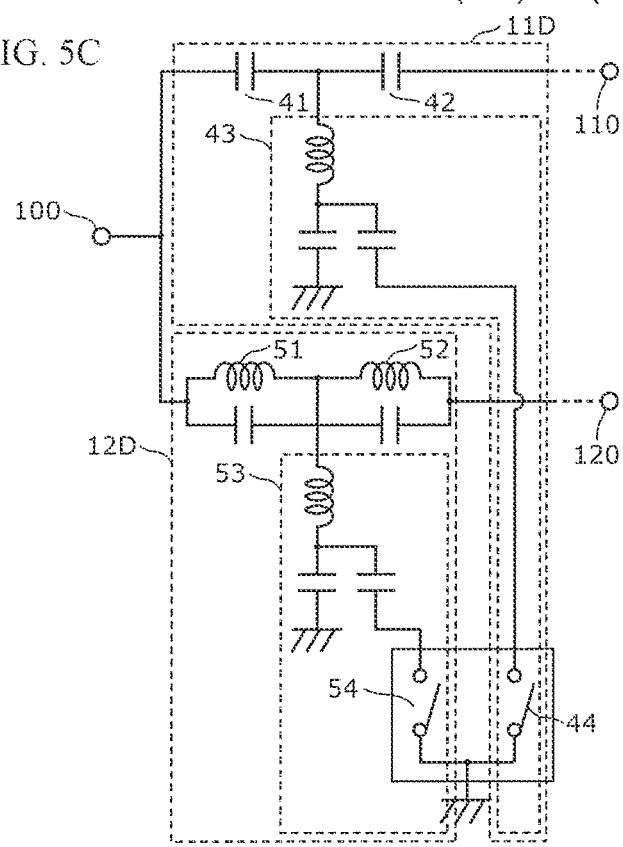

FIGS. 5A to 5C illustrate a circuit configuration of radio frequency module 1D according to Variation 5 of Embodiment 1. FIG. 5A illustrates filter circuits 11D and 12D that are portions of the circuit configuration of radio frequency module 1D different from radio frequency module 1 according to the embodiment. FIG. 5B illustrates a frequency relation of approximate passing characteristics to communication bands of filter circuits 11D and 12D. FIG. 5C illustrates an example of a circuit configuration of filter circuits 11D and 12D.

Radio frequency module 1D includes antenna terminal 100, input/output terminals 110 and 120, filter circuits 11D and 12D, band-elimination filter circuit 13, switches 14, 15, 18, and 19, transmission amplifiers 16T and 17T, and reception amplifiers 16R and 17R. As illustrated in FIG. 5A, radio frequency module 1D according to this variation is different from radio frequency module 1 according to the embodiment, only in the configuration of filter circuit 11D that is a second filter circuit and filter circuit 12D that is a first filter circuit. The following describes radio frequency module 1D, focusing on different points from radio frequency module 1, while description of the same points is omitted.

Filter circuit 11D is an example of a second filter circuit, and is a highpass filter having a variable passband that is the second frequency band and a variable attenuation band. Filter circuit 12D is an example of the first filter circuit, and is a low pass filter having a variable passband that is the first frequency band and a variable attenuation band.

Radio frequency module 1D according to this variation is used, for example, when (1) a radio frequency signal of 4G-LTE B42 (3400 MHz to 3600 MHz) belonging to the first frequency band and a radio frequency signal of 5G-NR n79 (a "Low" band) belonging to the second frequency band are simultaneously transferred, and (2) when a radio frequency signal of 5G-NR n77 belonging to the first frequency band and a radio frequency signal of 5G-NR n79 (a "High" band) belonging to the second frequency band are simultaneously transferred. The passbands and the attenuation bands of filter circuits 11D and 12D are varied according to which of (1) and (2) above is performed. For example, when (1) above is performed, the passband of filter circuit 11D and the passband of filter circuit 12D shift to lower frequency ranges (the solid lines in FIG. 5B). Accordingly, an isolation between a radio frequency signal of 4G-LTE B42 and a radio frequency signal of 5G-NR n79 (a "Low" band) is ensured, and the transfer loss can be reduced. For example, when (2) above is performed, the passband of filter circuit 11D and the passband of filter circuit 12D shift to higher frequency ranges (the dashed lines in FIG. 5B). Accordingly, the isolation between a radio frequency signal of 5G-NR n77 and a radio frequency signal of 5G-NR n79 (a "High" band) is ensured, and the transfer loss can be reduced.

For example, a circuit configuration of filter circuits 11D and 12D includes an LC filter, as illustrated in FIG. 5C.

Filter circuit 11D includes capacitors 41 and 42 disposed on the second path that connects antenna terminal 100 and input/output terminal 110, and LC series resonance circuit 43 disposed between the second path and the ground. LC series resonance circuit 43 includes one inductor, two capacitors, and switch 44, and has a resonance frequency that varies according to switching of switch 44. This configuration allows filter circuit 11D to form a highpass filter having a variable attenuation pole.

Filter circuit 12D includes inductors 51 and 52 disposed on the first path that connects antenna terminal 100 and input/output terminal 120, and LC series resonance circuit 53 disposed between the first path and the ground. LC series resonance circuit 53 includes one inductor, two capacitors, and switch 54, and has a resonance frequency that varies according to switching of switch 54. This configuration allows filter circuit 12D to form a low pass filter having a variable attenuation pole.

FIGS. 6A to 6D illustrate circuit configurations of radio frequency module 1E according to Variation 6 of Embodiment 1. FIG. 6A illustrates filter circuit 11E that is a portion of the circuit configuration of radio frequency module 1E different from radio frequency module 1 according to the embodiment. FIG. 6B illustrates a frequency relation of approximate passing characteristics to communication bands of filter circuits 11E and 12. FIGS. 6C and 6D illustrate an example of a circuit configuration of filter circuit 11E.

Radio frequency module 1E includes antenna terminal 100, input/output terminals 110 and 120, filter circuits 11E and 12, band-elimination filter circuit 13, switches 14, 15, 18, and 19, transmission amplifiers 16T and 17T, and reception amplifiers 16R and 17R. As illustrated in FIG. 6A, radio frequency module 1E according to this variation is different from radio frequency module 1 according to the embodiment, only in the configuration of filter circuit 11E that is a second filter circuit. The following describes radio frequency module 1E, focusing on different points from radio frequency module 1, while description of the same points is omitted.

Filter circuit 11E is an example of a second filter circuit, and is a highpass filter having a variable passband that is the second frequency band and a variable attenuation slope. Note that an attenuation slope is an inclination of insertion loss from a lower frequency edge of a passband to an attenuation band having a lower frequency range, in the passing characteristics of filter circuit 11E.

Radio frequency module 1E according to this variation is used (3) when a radio frequency signal of 5G-NR n77 belonging to the first frequency band and a radio frequency signal of 5G-NR n79 (a "Low" band) belonging to the second frequency band are simultaneously transferred, and (4) when a radio frequency signal of 5G-NR n79 belonging to the second frequency band is transferred and a radio frequency signal of 5G-NR n77 belonging to the first frequency band is not transferred, for example. The passband and the attenuation slope of filter circuit 11E vary according to which of (3) and (4) above is performed. For example, when (3) above is performed, the attenuation slopes of filter circuit 11E are steep (the solid lines in FIG. 6B). Accordingly, the isolation between a radio frequency signal of 5G-NR n77 and a radio frequency signal of 5G-NR n79 is ensured. For example, when (4) above is performed, the attenuation slope of filter circuit 11E is gentle (the dashed line in FIG. 6B). Thus, the transfer loss of a radio frequency signal of a lower frequency range in the passband that is 5G-NR n79 can be reduced.

For example, a circuit configuration of filter circuit 11E includes an LC filter that includes acoustic wave resonator 11$p$1, as illustrated in FIG. 6C. Filter circuit 11E includes series-arm circuits 11$s$1 and 11$s$2 disposed on the second path that connects antenna terminal 100 and input/output terminal 110, acoustic wave resonator 11$p$1 disposed between the second path and the ground, parallel-arm circuits 11$p$2 and 11$p$3, and switch SW1. Series-arm circuits 11$s$1 and 11$s$2 and parallel-arm circuits 11$p$2 and 11$p$3 each include at least one of an inductor or a capacitor. Acoustic wave resonator 11$p$1 and a series connection circuit of parallel-arm circuit 11$p$3 and switch SW1 are connected in parallel. When switch SW1 is conducting, the attenuation slope of filter circuit 11E is determined by the Q factor of parallel-arm circuit 11$p$3 mainly, and is gentle. On the other hand, when switch SW1 is non-conducting, the attenuation slope of filter circuit 11E is determined by the Q factor of acoustic wave resonator 11$p$1 mainly, and is steep. Accordingly, filter circuit 11E forms a highpass filter having a variable passband and a variable attenuation slope. Note that series-arm circuits 11$s$1 and 11$s$2 and parallel-arm circuits 11$p$2 and 11$p$3 may not each include an inductor or a capacitor, and may each include only a line.

For example, a circuit configuration of filter circuit 11E includes an LC filter that includes acoustic wave resonator 11$p$1, as illustrated in FIG. 6D. Filter circuit 11E includes series-arm circuits 11$s$1 and 11$s$2 disposed on the second path that connects antenna terminal 100 and input/output terminal 110, and acoustic wave resonator 11$p$1, parallel-arm circuit 11$p$2, and switch SW2 that are disposed between the second path and the ground. Series-arm circuits 11$s$1 and 11$s$2 and parallel-arm circuit 11$p$2 each include at least one of an inductor or a capacitor. Acoustic wave resonator 11$p$1, parallel-arm circuit 11$p$2, and switch SW2 are connected in series. When switch SW2 is conducting, the attenuation slope of filter circuit 11E is determined by the Q factors of acoustic wave resonator 11$p$1 and parallel-arm circuit 11$p$2, and is steep. On the other hand, when switch SW2 is non-conducting, the attenuation slope of filter circuit 11E is not determined by the Q factor of acoustic wave resonator 11$p$1, and is gentle. Accordingly, filter circuit 11E forms a highpass filter having a variable passband and a variable attenuation slope. Note that series-arm circuits 11$s$1 and 11$s$2 and parallel-arm circuits 11$p$2 and 11$p$3 may each include only a line without including an inductor or a capacitor.

Note that as illustrated in FIGS. 5A to 5C, a second filter circuit (filter circuit 11D) and a first filter circuit (filter circuit 12D) may both have variable passbands, or as illustrated in FIGS. 6A to 6D, only one of the second filter circuit (filter circuit 11E) and the first filter circuit (filter circuit 12) may have a variable passband.

Embodiment 2

Radio frequency module 1F according to the present embodiment includes a circuit that transfers a radio frequency signal of a third frequency band (an unlicensed band ranging from 5 GHz or higher), in addition to a circuit that transfers radio frequency signals of a first frequency band and a second frequency band.

2.1 Configuration of Radio Frequency Module 1F and Communication Device 7F

Figure 7:
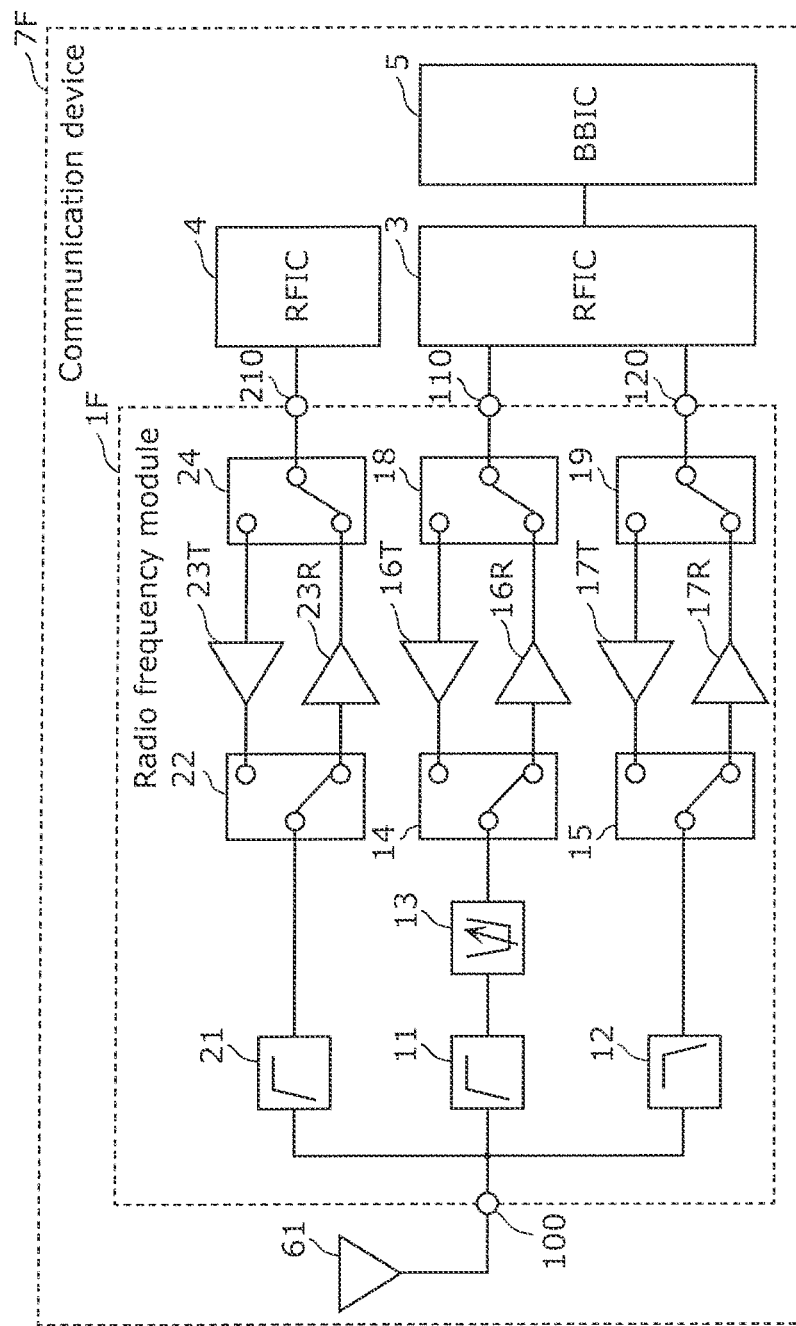
FIG. 7 illustrates a circuit configuration of a radio frequency module and a communication device according to Embodiment 2.

FIG. 7 illustrates a circuit configuration of radio frequency module 1F and communication device 7F according to Embodiment 2. As illustrated in FIG. 7, communication device 7F includes radio frequency module 1F, RFICs 3 and 4, BBIC 5, and antenna 61. Communication device 7F according to the present embodiment is different from communication device 7 according to Embodiment 1, in that WLAN circuit 2 is included in radio frequency module 1F, and a single antenna is included. The following describes communication device 7F according to the present embodiment, focusing on differences from communication device 7 according to Embodiment 1.

Antenna 61 radiates and receives radio frequency signals of the first frequency band, the second frequency band, and the third frequency band.

Note that in the present embodiment, the second frequency band corresponds to a communication band close to the lowest frequency of the unlicensed band ranging from 5 GHz or higher, and is a communication band of 4G-LTE or 5G-NR, for example. In particular, the second frequency band is, for example, 5G-NR n79 whose frequency interval to the unlicensed band is narrow. In the present embodiment, the first frequency band corresponds to a communication band close to the lowest frequency of the second frequency band, and is, for example, a communication band of 4G-LTE or 5G-NR. In particular, the first frequency band is 5G-NR n77, for example. In the present embodiment, the third frequency band corresponds to a communication band belonging to the unlicensed band ranging from 5 GHz or higher. The third frequency band is WLAN (Wi-Fi®), B46 of LAA, or NR-U, for example.

Radio frequency module 1F includes antenna terminal 100, input/output terminals 110, 120, and 210, filter circuits 11, 12, and 21, band-elimination filter circuit 13, switches 14, 15, 18, 19, 22, and 24, transmission amplifiers 16T, 17T, and 23T, and reception amplifiers 16R, 17R, and 23R.

Antenna terminal 100 is connected to antenna 61.

Filter circuit 21 is an example of a third filter circuit, and is a filter disposed on a path that connects antenna terminal 200 and input/output terminal 210, and having a passband that is the third frequency band.

In the present embodiment, filter circuits 11, 12, and 21 are directly connected to antenna terminal 100. That is, filter circuits 11, 12, and 21 form a triplexer that demultiplexes and multiplexes a radio frequency signal of the first frequency band, a radio frequency signal of the second frequency band, and a radio frequency signal of the third frequency band.

Note that filter circuits 11, 12, and 21 may not be directly connected to antenna terminal 100. In this case, a switch that switches between the connection and disconnection of antenna terminal 100 to/from filter circuit 11, switches between the connection and disconnection of antenna terminal 100 to/from filter circuit 12, and switches between the connection and disconnection of antenna terminal 100 to/from filter circuit 21 may be disposed between antenna terminal 100 and filter circuits 11, 12, and 21.

According to the above configuration of radio frequency module 1F according to the present embodiment, the same effects as those yielded by radio frequency module 1 according to Embodiment 1 can be produced. Furthermore, the number of disposed antennas included in communication device 7F can be reduced.

Figure 8:
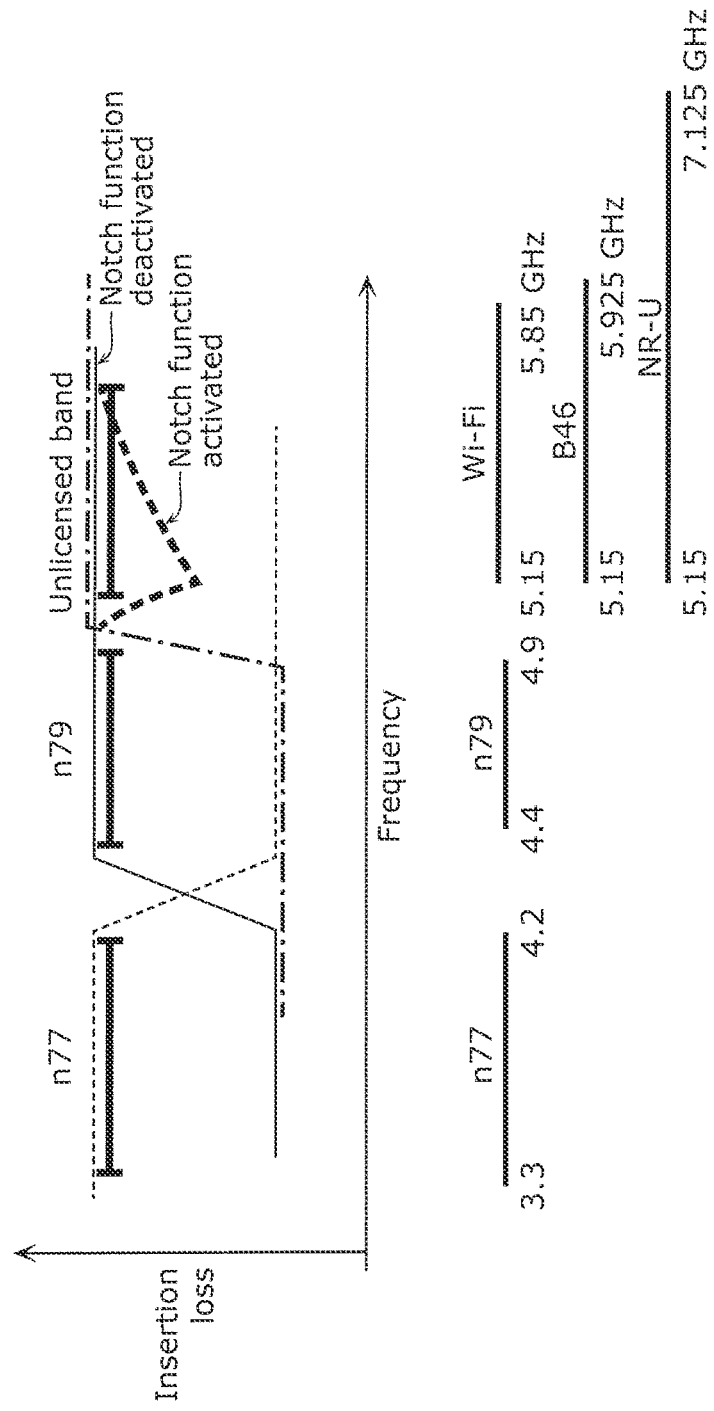
FIG. 8 illustrates an example of communication bands and filter passing characteristics applied to the radio frequency module according to Embodiment 2.

2.2 Communication Bands and Filter Passing Characteristics Applied to Radio Frequency Module 1F FIG. 8 illustrates an example of communication bands and filter passing characteristics applied to radio frequency module 1F according to Embodiment 2. 5G-NR n77, for example, is applied as the first frequency band, 5G-NR n79, for example, is applied as the second frequency band, and WLAN (Wi-Fi®) of the unlicensed band, B46 of LAA, or NR-U, for example, is applied as the third frequency band.

In FIG. 8, filter circuit 12 is a lowpass filter having a passband that is n77, an attenuation band that is n79, and an attenuation band that is the unlicensed band. Filter circuit 11 is a highpass filter having a passband that is n79 and an attenuation band that is n77. Band-elimination filter circuit 13 is a filter circuit that changes between attenuating a signal of a partial band of the unlicensed band (activating the notch function) and not attenuating a signal of the partial band (deactivating the notch function).

Filter circuit 21 is a highpass filter having a passband that is a frequency range of WLAN (Wi-Fi®) of the unlicensed band, an attenuation band that is n77, and an attenuation band that is n79, for example.

Accordingly, when n79 and the unlicensed band close to each other are simultaneously used, a high isolation between signals of n79 and the unlicensed band can be ensured by activating the notch function of band-elimination filter circuit 13. When the unlicensed band is not simultaneously used when n79 is used, the transfer loss of a radio frequency signal of n79 can be reduced by deactivating the notch function of band-elimination filter circuit 13.

Embodiment 3

Radio frequency module 1G according to the present embodiment includes a circuit that transfers a radio frequency signal of a second frequency band close to an unlicensed band.

3.1 Configuration of Radio Frequency Module 1G and Communication Device 7G

Figure 9A:
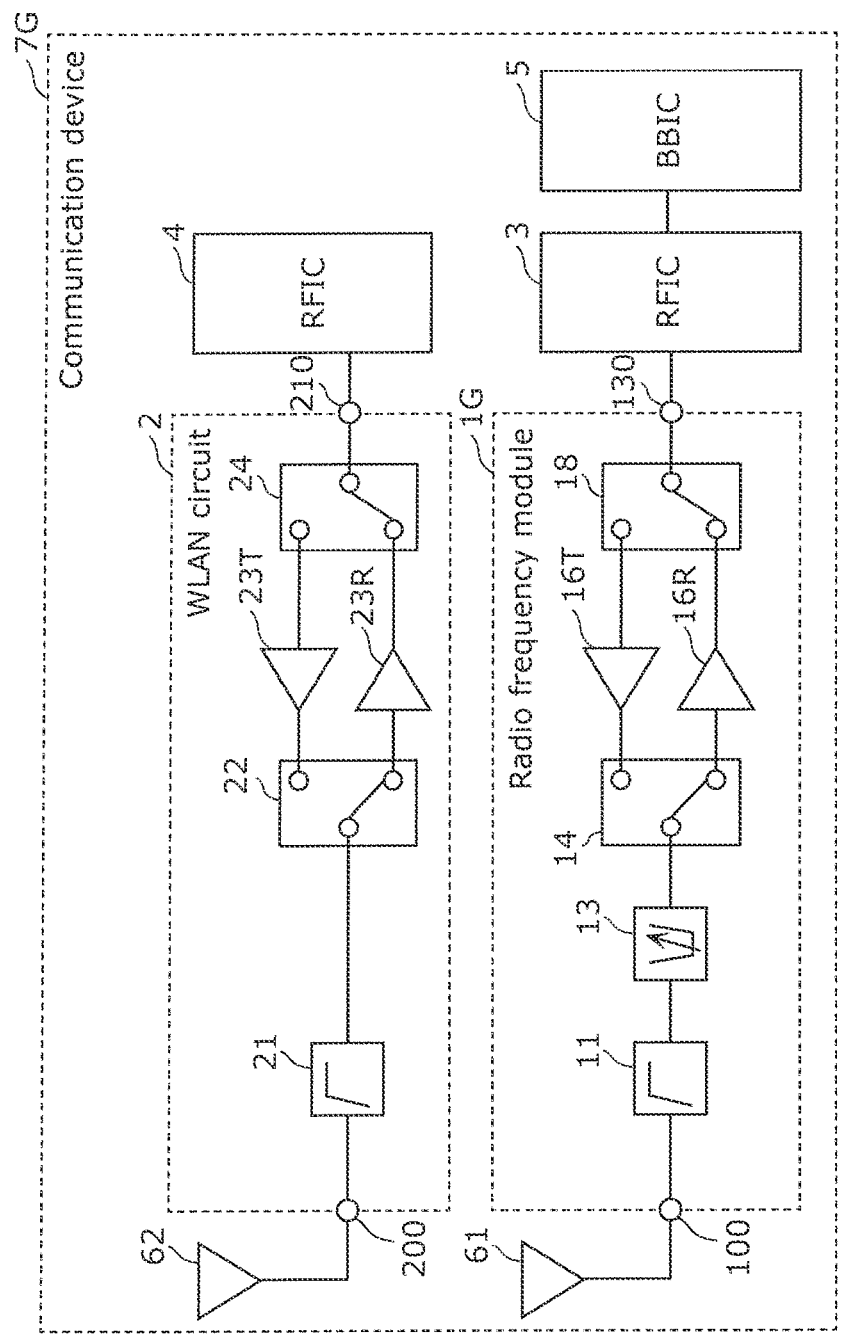
FIG. 9A illustrates a circuit configuration of a radio frequency module and a communication device according to Embodiment 3.

FIG. 9A illustrates a circuit configuration of radio frequency module 1G and communication device 7G according to Embodiment 3. As illustrated in FIG. 9A, communication device 7G includes radio frequency module 1G, WLAN circuit 2, RFICs 3 and 4, BBIC 5, and antennas 61 and 62. Communication device 7G according to the present embodiment is different from communication device 7 according to Embodiment 1, in that a circuit that transfers a radio frequency signal of a first frequency band is not included. The following describes communication device 7G according to the present embodiment, focusing on differences from communication device 7 according to Embodiment 1.

Antenna 61 radiates and receives radio frequency signals of the second frequency band. Antenna 62 radiates and receives radio frequency signals of a third frequency band.

Radio frequency module 1G includes antenna terminal 100, input/output terminal 130, filter circuit 11, band-elimination filter circuit 13, switches 14 and 15, transmission amplifier 16T, and reception amplifier 16R.

Antenna terminal 100 is connected to antenna 61.

Filter circuit 11 is an example of a second filter circuit, and is a filter that is disposed on a second path that connects antenna terminal 100 and input/output terminal 130 (a second input/output terminal), has a passband that is the second frequency band, and attenuates a signal of the first frequency band lower or higher than the second frequency band. Filter circuit 11 is a so-called LC filter that includes an inductor and a capacitor.

Band-elimination filter circuit 13 is an example of a first band-elimination filter circuit, and is a band-elimination filter that is disposed on the second path, and has an attenuation band that is a partial band of the third frequency band that belongs to an unlicensed band ranging from 5 GHz or higher and is higher or lower than the second frequency band. Band-elimination filter circuit 13 changes at least one of a frequency range or an amount of attenuation of the attenuation band.

Note that in band-elimination filter circuit 13, the frequency range or the amount of attenuation of the attenuation band may be fixed (alternatively, may not be changed).

WLAN circuit 2 includes antenna terminal 200, input/output terminal 210, filter circuit 21, switches 22 and 24, transmission amplifier 23T, and reception amplifier 23R.

Antenna terminal 200 is connected to antenna 62.

Filter circuit 21 is an example of a third filter circuit, and is a filter disposed on a third path that connects antenna terminal 200 and input/output terminal 210, and having a passband that is the third frequency band.

Note that WLAN circuit 2 may be included in radio frequency module 1G.

Figure 9B:
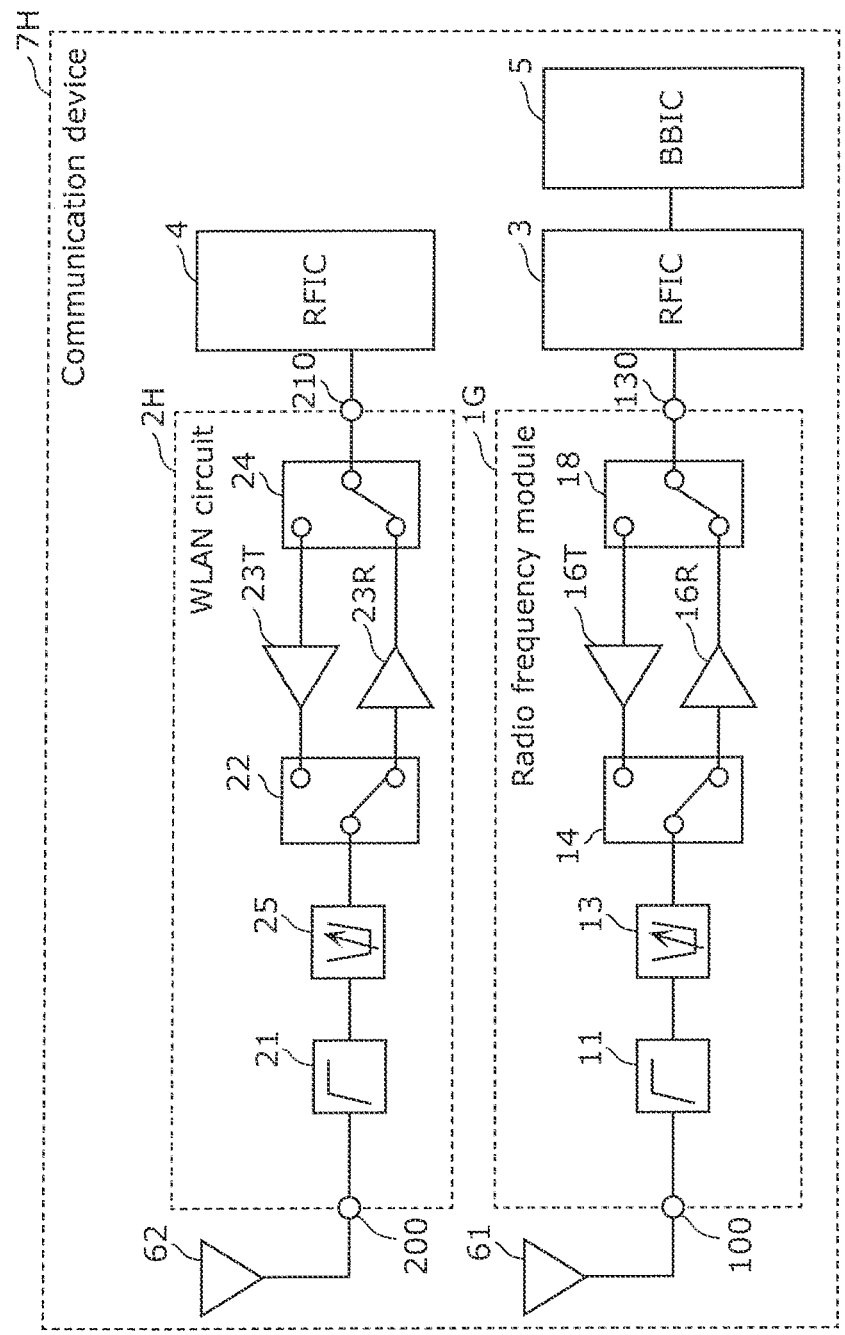
FIG. 9B illustrates a circuit configuration of the radio frequency module and a communication device according to a variation of Embodiment 3.

FIG. 9B illustrates a circuit configuration of radio frequency module 1G and communication device 7H according to a variation of Embodiment 3. As illustrated in FIG. 9B, communication device 7H includes radio frequency module 1G, WLAN circuit 2H, RFICs 3 and 4, BBIC 5, and antennas 61 and 62. Communication device 7H according to this variation is different from communication device 7G according to Embodiment 3 in the configuration of WLAN circuit 2H. The following describes communication device 7H according to this variation, focusing on differences from communication device 7G according to Embodiment 3.

WLAN circuit 2H includes antenna terminal 200, input/output terminal 210, filter circuit 21, band-elimination filter circuit 25, switches 22 and 24, transmission amplifier 23T, and reception amplifier 23R.

Antenna terminal 200 is connected to antenna 62.

Filter circuit 21 is an example of a third filter circuit, and is a filter disposed on the third path that connects antenna terminal 200 and input/output terminal 210, and having a passband that is the third frequency band.

Band-elimination filter circuit 25 is an example of a second band-elimination filter circuit, and is a band-elimination filter disposed on the third path and having an attenuation band that is a partial band of the second frequency band. Band-elimination filter circuit 25 changes at least one of a frequency range or an amount of attenuation of the attenuation band.

Note that in band-elimination filter circuit 25, the frequency range and the amount of attenuation of the attenuation band may be fixed (alternatively, may not be changed).

Note that WLAN circuit 2H may be included in radio frequency module 1G.

Figure 10A:
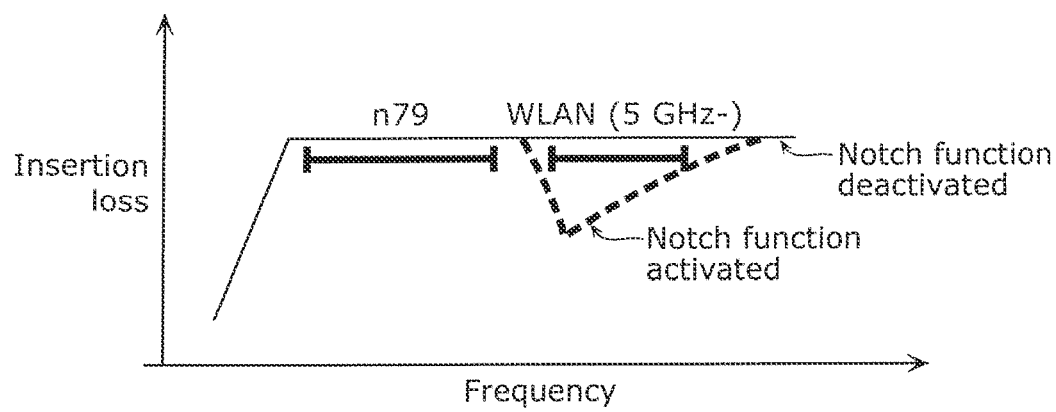
FIG. 10A illustrates a first example of filter passing characteristics of the radio frequency module according to Embodiment 3 and the variation thereof.

3.2 Communication Bands and Filter Passing Characteristics Applied to Radio Frequency Module 1G FIG. 10A illustrates a first example of filter passing characteristics of radio frequency module 1G according to Embodiment 3 and the variation thereof. 5G-NR n79, for example, is applied as the second frequency band, and WLAN (Wi-Fi®) of the unlicensed band, for example, is applied as the third frequency band.

In FIG. 10A, filter circuit 11 is a highpass filter that has a passband that is n79, and attenuates a signal of n77 that is the first frequency band. Band-elimination filter circuit 13 changes between attenuating a signal of a partial band of WLAN (Wi-Fi®) (activating the notch function) and not attenuating a signal of the partial band (deactivating the notch function).

Accordingly, when n79 and the unlicensed band close to each other are simultaneously used, a high isolation between signals of n79 and the unlicensed band can be ensured by activating the notch function of band-elimination filter circuit 13. When the unlicensed band is not simultaneously used when n79 is used, transfer loss of a radio frequency signal of n79 can be reduced by deactivating the notch function of band-elimination filter circuit 13.

Note that in WLAN circuit 2H according to the variation of Embodiment 3, filter circuit 21 is a filter having a passband that is WLAN (Wi-Fi®), for example. Band-elimination filter circuit 25 changes between attenuating a signal of a partial band of n79 (activating the notch function) and not attenuating a signal of the partial band (deactivating the notch function), for example.

Accordingly, when WLAN (Wi-Fi®) and n79 that are close to each other are simultaneously used, a high isolation between signals of WLAN (Wi-Fi®) and n79 can be ensured by activating the notch function of band-elimination filter circuit 25. When n79 is not simultaneously used when WLAN (Wi-Fi®) is used, transfer loss of a radio frequency signal of WLAN (Wi-Fi®) can be reduced by deactivating the notch function of band-elimination filter circuit 25.

In radio frequency module 1G according to Embodiment 3 and the variation thereof, filter circuit 11 may be a highpass filter that has a passband that is NR-U (5.15 GHz to 5.85 GHz), and attenuates a signal of the first frequency band. At this time, band-elimination filter circuit 13 may be a filter circuit that changes between attenuating a signal of a partial band of WLAN (5.925 GHz to 7.125 GHz) (activating the notch function) and not attenuating a signal of the partial band (deactivating the notch function).

Figure 10B:
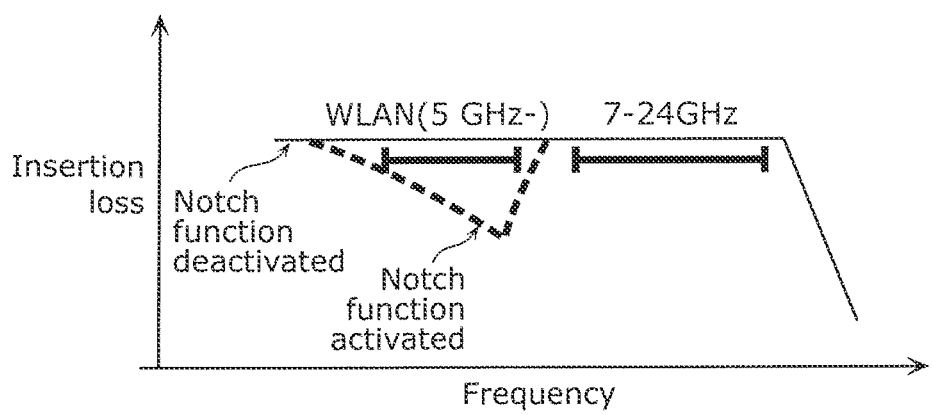
FIG. 10B illustrates a second example of filter passing characteristics of the radio frequency module according to Embodiment 3 and the variation thereof.

FIG. 10B illustrates a second example of filter passing characteristics of radio frequency module 1G according to Embodiment 3 and the variation thereof. A frequency range included in the band from 7 GHz to 24 GHz, for example, is applied as the second frequency band, and WLAN (Wi-Fi®) of the unlicensed band, for example, is applied as the third frequency band.

In FIG. 10B, filter circuit 11 is a lowpass filter that has a passband that is the second frequency band included in the band from 7 GHz to 24 GHz, and attenuates a signal of the first frequency band higher than the second frequency band. Band-elimination filter circuit 13 changes between attenuating a signal of a partial band of WLAN (Wi-Fi®) (activating the notch function) and not attenuating a signal of the partial band (deactivating the notch function).

Accordingly, when the second frequency band in the band from 7 GHz to 24 GHz and the unlicensed band that are close to each other are used simultaneously, the high isolation between the second frequency band and the unlicensed band can be ensured by activating the notch function of band-elimination filter circuit 13. When the unlicensed band is not simultaneously used when the second frequency band is used, transfer loss of a radio frequency signal of the second frequency band can be reduced by deactivating the notch function of band-elimination filter circuit 13.

Note that in WLAN circuit 2H according to the variation of Embodiment 3, filter circuit 21 is a filter having a passband that is WLAN (Wi-Fi®), for example. Band-elimination filter circuit 25 changes between attenuating a signal of a partial band of the band from 7 GHz to 24 GHz (activating the notch function) and not attenuating a signal of the partial band (deactivating the notch function).

Accordingly, when WLAN (Wi-Fi®) and a communication band belonging to the band from 7 GHz to 24 GHz, which are close to each other, are used simultaneously, the high isolation between signals of WLAN (Wi-Fi®) and the communication band belonging to the band from 7 GHz to 24 GHz can be ensured by activating the notch function of band-elimination filter circuit 25. When a communication band belonging to the band from 7 GHz to 24 GHz is not used simultaneously when WLAN (Wi-Fi®) is used, transfer loss of a radio frequency signal of WLAN (Wi-Fi®) can be reduced by deactivating the notch function of band-elimination filter circuit 25.

In radio frequency module 1G according to Embodiment 3 and the variation thereof, filter circuit 11 may be a lowpass filter that has a passband that is the second frequency band included in NR-U (5.925 GHz to 7.125 GHz), and attenuates a signal of the first frequency band higher than the second frequency band. At this time, band-elimination filter circuit 13 may be a filter circuit that changes between attenuating a signal of a partial band of WLAN (5.15 GHz to 5.85 GHz) (activating the notch function) and not attenuating a signal of the partial band (deactivating the notch function).

As described above, radio frequency module 1 according to Embodiment 1 includes: antenna terminal 100; input/output terminal 110; input/output terminal 120; filter circuit 12 disposed on a first path and having a passband that is a first frequency band, the first path connecting antenna terminal 100 and input/output terminal 120; filter circuit 11 disposed on a second path and having a passband that is a second frequency band higher than the first frequency band, the second path connecting antenna terminal 100 and input/output terminal 110; and band-elimination filter circuit 13 disposed on the second path and having an attenuation band that is a partial band of a third frequency band belonging to an unlicensed band that ranges from 5 GHz or higher, the third frequency band being higher than the second frequency band. Filter circuit 11 is an LC filter circuit that includes an inductor and a capacitor.

According to this, filter circuit 11 that passes a signal of the second frequency band is formed with an LC filter, and thus the passband of filter circuit 11 can be increased. Although filter circuit 11 can use the first frequency band as an attenuation band, filter circuit 11 is an LC filter, and thus cannot fully ensure the amount of attenuation of the third frequency band. To address this, band-elimination filter circuit 13 having an attenuation band that is a partial band of the third frequency band is disposed on the second path. Accordingly, the high isolation can be ensured when the second frequency band and the third frequency band close to each other are simultaneously used. Specifically, it is possible to provide radio frequency module 1 that can reduce deterioration of communication quality when a radio frequency signal of the unlicensed band ranging from 5 GHz or higher and a wide band close to the unlicensed band are simultaneously used.

In radio frequency module 1, band-elimination filter circuit 13 may be configured to change at least one of a frequency range of the attenuation band or an amount of attenuation of the attenuation band.

According to this, according to whether a radio frequency signal of the second frequency band is used simultaneously with a radio frequency signal of the third frequency band, band-elimination filter circuit 13 can change at least one of the frequency range or the amount of attenuation of the third frequency band. Furthermore, according to a partial band of the third frequency band of a radio frequency signal used simultaneously with a radio frequency signal of the second frequency band, band-elimination filter circuit 13 changes at least one of the frequency range or the amount of attenuation of the partial band. A circuit configuration that highly attenuates a signal of the third frequency band is not added to filter circuit 11, and low loss of the passband is ensured, and thus when the second frequency band is not used simultaneously with the third frequency band, transfer loss of a radio frequency signal of the second frequency band can be reduced by not allowing band-elimination filter circuit 13 to operate.

In radio frequency module 1A, band-elimination filter circuit 13A may include: band-elimination filter 31 having an attenuation band that is the partial band; and switches 32 and 33 configured to controllably switch the connection of antenna terminal 100 between bypass path 71 and band-elimination filter 31, bypass path 71 bypassing band-elimination filter 31 and connecting antenna terminal 100 and input/output terminal 110.

Accordingly, band-elimination filter circuit 13A can function as a filter circuit that changes between attenuating a signal of a partial band of the third frequency band (activating the notch function) and not attenuating a signal of the partial band (deactivating the notch function).

In radio frequency module 1A, under a condition that a radio frequency signal of the second frequency band and a radio frequency signal of the partial band are simultaneously transferred, switches 32 and 33 may be configured to connect antenna terminal 100 to band-elimination filter 31.

Accordingly, the isolation when a radio frequency signal of the second frequency band and a radio frequency signal of the partial band are simultaneously transferred can be improved.

In radio frequency module 1C, filter circuit 11b may be connected between switch 32 and band-elimination filter 36, and may be configured to attenuate a signal of the first frequency band and a signal of the third frequency band.

Accordingly, band-elimination filter circuit 13C can function as a filter circuit that changes between attenuating a signal of a partial band of the third frequency band (activating the notch function) and not attenuating a signal of the partial band (deactivating the notch function). When a radio frequency signal of the second frequency band and a radio frequency signal of a partial band of the third frequency band are simultaneously used, the signals pass through high-attenuation filter circuit 11b, and thus the amount of attenuation of the partial band can be increased. On the other hand, when a radio frequency signal of the second frequency band is used, and a radio frequency signal of a partial band of the third frequency band is not used, the signals pass through low-loss filter circuit 11a, and thus transfer loss of a radio frequency signal of the second frequency band can be decreased.

In radio frequency module 1B, band-elimination filter circuit 13B may include: band-elimination filter 34 having an attenuation band that is a first region belonging to the third frequency band; band-elimination filter 35 having an attenuation band that is a second region belonging to the third frequency band; and switches 32 and 33 configured to controllably switch the connection of filter circuit 11 between band-elimination filter 34 and band-elimination filter 35.

Accordingly, band-elimination filter circuit 13B can function as a filter circuit that varies the frequency range of the attenuation band in the third frequency band.

In radio frequency module 1, filter circuit 12 and filter circuit 11 may be directly connected to antenna terminal 100.

Accordingly, filter circuits 11 and 12 are included in a diplexer that demultiplexes and multiplexes a radio frequency signal of the first frequency band and a radio frequency signal of the second frequency band, and thus radio frequency module 1 is further miniaturized.

Radio frequency module 1F according to Embodiment 2 may further include: filter circuit 21 having a passband that is the third frequency band, in addition to filter circuits 11 and 12 and band-elimination filter circuit 13.

Accordingly, it is possible to provide radio frequency module 1F that can reduce deterioration of communication quality when a radio frequency signal of the unlicensed band ranging from 5 GHz or higher and a wide band close to the unlicensed band are simultaneously used. Furthermore, the number of disposed antennas included in communication device 7F can be reduced.

Radio frequency module 1 may further include: band-elimination filter circuit 25 disposed on a third path and having an attenuation band that is a partial band of the second frequency band, the third path being a path on which filter circuit 21 is disposed.

Accordingly, the high isolation in the third path can be ensured according to the state of simultaneously using the third frequency band and the second frequency band close to each other.

Band-elimination filter circuit 13 may include: inductor 131 and capacitor 132 connected in series to a ground path that connects the second path and a ground; and switch 133 disposed on the ground path.

Accordingly, the impedance local minimum point of an LC series resonant circuit that includes inductor 131 and capacitor 132 can be an attenuation pole, a signal of a partial band of the third frequency band can be attenuated by placing switch 133 into the conducting state, and a signal of the partial band of the third frequency band can be prevented from being attenuated by placing switch 133 into the non-conducting state.

The third frequency band may include a third region and a fourth region, the fourth region having a higher frequency range than the third region, and under a condition that a radio frequency signal of the second frequency band and a radio frequency signal of the fourth region are simultaneously transferred, switch 133 may be configured to connect the second path, inductor 131, capacitor 132, and the ground.

Accordingly, when the second frequency band and the fourth region of the third frequency band close to each other are used simultaneously, the high isolation between the second frequency band and the third frequency band can be ensured by placing switch 133 into the conducting state. When the fourth region is not simultaneously used when the second frequency band is used, transfer loss of a radio frequency signal of the second frequency band can be decreased by placing switch 133 into the non-conducting state. Note that if the fourth region is an attenuation band, a frequency interval between the fourth region and the second frequency band is relatively wide as compared with a frequency interval between the third region and the second frequency band, and thus band-elimination filter circuit 13 may not include an acoustic wave resonator.

Band-elimination filter circuit 13 may include: an acoustic wave resonator connected in series to a ground path that connects the second path and a ground; and switch 133 disposed on the ground path.

Accordingly, when the second frequency band and the third region of the third frequency band close to each other are simultaneously used, high isolation between signals of the second frequency band and the third frequency band can be ensured by placing switch 133 into the conducting state. When the fourth region is not simultaneously used when the second frequency band is used, transfer loss of a radio frequency signal of the second frequency band can be decreased by placing switch 133 into the non-conducting state. Note that when the third region is an attenuation band, a frequency interval between the third region and the second frequency band is relatively narrow, and thus the attenuation slope of band-elimination filter circuit 13 is to be made steep. Accordingly, band-elimination filter circuit 13 includes an acoustic wave resonator having a high resonance Q factor.

At least one of the passband of filter circuit 12 or the passband of filter circuit 11 may be variable.

Accordingly, even if a combination of the second frequency band and the third frequency band that are simultaneously used is changed, isolation between a radio frequency signal of the second frequency band and a radio frequency signal of the third frequency band can be ensured, and transfer loss can be decreased.

Filter circuit 11 may include a capacitive series-arm circuit disposed on the second path, band-elimination filter circuit 13 may include a capacitive series-arm circuit and one or more parallel-arm circuits, the capacitive series-arm circuit being disposed on the second path, and the capacitive series-arm circuit of filter circuit 11 and the capacitive series-arm circuit of band-elimination filter circuit 13 may be directly connected.

Accordingly, the impedance between filter circuit 11 and band-elimination filter circuit 13 can be readily matched, and a radio frequency signal of the second frequency band can be transferred through the second path while loss is kept low.

Radio frequency module 1G according to Embodiment 3 includes: antenna terminal 100; input/output terminal 130; filter circuit 11 disposed on a second path, having a passband that is a second frequency band, and configured to attenuate a signal of a first frequency band, the second path connecting antenna terminal 100 and input/output terminal 130, the first frequency band being lower than the second frequency band; and band-elimination filter circuit 13 disposed on the second path and having an attenuation band that is a partial band of a third frequency band belonging to an unlicensed band that ranges from 5 GHz or higher, the third frequency band being higher than the second frequency band. Filter circuit 11 is an LC filter circuit that includes an inductor and a capacitor, and band-elimination filter circuit 13 is configured to change at least one of a frequency range of the attenuation band or an amount of attenuation of the attenuation band.

Accordingly, when the second frequency band and the third frequency band close to each other are simultaneously used, high isolation between signals of the second frequency band and the third frequency band can be ensured by activating the notch function of band-elimination filter circuit 13. When the third frequency band is not simultaneously used when the second frequency band is used, transfer loss of a radio frequency signal of the second frequency band can be decreased by deactivating the notch function of band-elimination filter circuit 13.

Radio frequency module 1G according to Embodiment 3 includes: antenna terminal 100; input/output terminal 130; filter circuit 11 disposed on a second path, having a passband that is a second frequency band, and configured to attenuate a signal of a first frequency band, the second path connecting antenna terminal 100 and input/output terminal 130, the first frequency band being higher than the second frequency band; and band-elimination filter circuit 13 disposed on the second path and having an attenuation band that is a partial band of a third frequency band belonging to an unlicensed band that ranges from 5 GHz or higher, the third frequency band being lower than the second frequency band. Filter circuit 11 is an LC filter circuit that includes an inductor and a capacitor, and band-elimination filter circuit 13 is configured to change at least one of a frequency range of the attenuation band or an amount of attenuation of the attenuation band.

Accordingly, when the second frequency band and the third frequency band close to each other are simultaneously used, high isolation between the second frequency band and the third frequency band can be ensured by activating the notch function of band-elimination filter circuit 13. When the third frequency band is not simultaneously used when the second frequency band is used, transfer loss of a radio frequency signal of the second frequency band can be decreased by deactivating the notch function of band-elimination filter circuit 13.

Radio frequency module 1G may further include: filter circuit 21 disposed on a third path and having a passband that is the third frequency band; and band-elimination filter circuit 25 disposed on the third path and having an attenuation band that is a partial band of the second frequency band.

Accordingly, high isolation in the third path can be ensured according to the state of simultaneously using the third frequency band and the second frequency band close to each other.

Communication device 7 includes: antennas 61 and 62; RFIC 3 configured to process radio frequency signals to be transmitted by antennas 61 and 62 and radio frequency signals received by antennas 61 and 62; and radio frequency module 1 configured to transfer the radio frequency signals between antenna 61 and RFIC 3.

Accordingly, it is possible to provide communication device 7 that can reduce deterioration of communication quality when a radio frequency signal of the unlicensed band ranging from 5 GHz or higher and a wide band close to the unlicensed band are simultaneously used.

4. Other Embodiments

The above has described the radio frequency module and the communication device according to the present disclosure, using the embodiments and the variations thereof, yet the present disclosure is not limited to the embodiments and the variations. The present disclosure also encompasses another embodiment achieved by combining arbitrary elements in the embodiments and the variations, and variations as a result of applying, to the embodiments, various modifications that may be conceived by those skilled in the art without departing from the scope of the present disclosure, and various devices that include the radio frequency module and the communication device according to the present disclosure.

For example, in the radio frequency module and the communication device according to the above embodiments and variations, matching elements such as an inductor and a capacitor and a switch circuit may be connected between elements. Note that the inductor may include a line inductor achieved by a line that connects elements.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The present disclosure can be widely used in communication apparatuses such as mobile phones, as a radio frequency module and a communication device that are applicable to a multi-band system including an unlicensed band ranging from 5 GHz or higher.

The invention claimed is:

1. A radio frequency module, comprising:
an antenna terminal;
a first input/output terminal;
a second input/output terminal;
a first filter circuit disposed on a first path and having a passband that is a first frequency band, the first path connecting the antenna terminal and the first input/output terminal;
a second filter circuit disposed on a second path and having a passband that is a second frequency band higher than the first frequency band, the second path connecting the antenna terminal and the second input/output terminal; and
a first band-elimination filter circuit that is a part of the second filter and that has an attenuation band that is a partial band of a third frequency band belonging to an unlicensed band, the third frequency band being higher than the second frequency band.

2. The radio frequency module according to claim 1, wherein the first band-elimination filter circuit is configured to change at least one of a frequency range of the attenuation band or an amount of attenuation of the attenuation band.

3. The radio frequency module according to claim 1, wherein the first band-elimination filter circuit includes:
a first band-elimination filter having an attenuation band that is the partial band of the third frequency band; and
a first switch configured to controllably switch a connection of the antenna terminal between a bypass path and the first band-elimination filter, the bypass path bypassing the first band-elimination filter and connecting the antenna terminal and the second input/output terminal.

4. The radio frequency module according to claim 3, wherein under a condition that a radio frequency signal of the second frequency band and a radio frequency signal of the partial band of the third frequency band are simultaneously transferred, the first switch is configured to connect the antenna terminal to the first band-elimination filter.

5. The radio frequency module according to claim 3, wherein the second filter circuit is connected between the first switch and the first band-elimination filter, and is configured to attenuate a signal of the first frequency band and a signal of the third frequency band.

6. The radio frequency module according to claim 1, wherein the first band-elimination filter circuit includes:
a second band-elimination filter having an attenuation band that is a first region belonging to the third frequency band;

a third band-elimination filter having an attenuation band that is a second region belonging to the third frequency band; and a second switch configured to controllably switch a connection of the second filter circuit between the second band-elimination filter and the third band-elimination filter.

7. The radio frequency module according to claim 1, wherein the first filter circuit and the second filter circuit are directly connected to the antenna terminal.

8. The radio frequency module according to claim 1, further comprising:

a third filter circuit having a passband that is the third frequency band.

9. The radio frequency module according to claim 8, further comprising:

a second band-elimination filter circuit disposed on a third path and having an attenuation band that is a partial band of the second frequency band, the third path being a path on which the third filter circuit is disposed.

10. The radio frequency module according to claim 1, wherein the first band-elimination filter circuit includes:

an inductor and a capacitor connected in series to a ground path that connects the second path and a ground; and a third switch disposed on the ground path.

11. The radio frequency module according to claim 10, wherein the third frequency band includes a third region and a fourth region, the fourth region having a higher frequency range than the third region, and under a condition that a radio frequency signal of the second frequency band and a radio frequency signal of the fourth region are simultaneously transferred, the third switch is configured to connect the second path, the inductor, the capacitor, and the ground.

12. The radio frequency module according to claim 1, wherein the first band-elimination filter circuit includes:

an acoustic wave resonator connected in series to a ground path that connects the second path and a ground; and a fourth switch disposed on the ground path.

13. The radio frequency module according to claim 12, wherein the third frequency band includes a third region and a fourth region, the fourth region having a higher frequency range than the third region, and under a condition that a radio frequency signal of the second frequency band and a radio frequency signal of the third region are simultaneously transferred, the fourth switch is configured to connect the second path, the acoustic wave resonator, and the ground.

14. The radio frequency module according to claim 1, wherein at least one of the passband of the first filter circuit or the passband of the second filter circuit is variable.

15. The radio frequency module according to claim 1, wherein the second filter circuit includes a capacitive series-arm circuit disposed on the second path, the first band-elimination filter circuit includes a capacitive series-arm circuit and one or more parallel-arm circuits, the capacitive series-arm circuit being disposed on the second path, and the capacitive series-arm circuit of the second filter circuit and the capacitive series-arm circuit of the first band-elimination filter circuit are directly connected.

16. A radio frequency module, comprising:

an antenna terminal;

a first input/output terminal;

a second input/output terminal;

a first filter circuit disposed on a first path and having a passband that is a first frequency band, the first path connecting the antenna terminal and the first input/output terminal;

a second filter circuit disposed on a second path and having a passband that is a second frequency band higher than the first frequency band, the second path connecting the antenna terminal and the second input/output terminal; and a first band-elimination filter circuit that is a part of the second filter and that has an attenuation band that is a partial band of a third frequency band belonging to an unlicensed band, the third frequency band being higher than the second frequency band, wherein the second filter circuit includes:

a first series-arm circuit disposed on the second path;

a second series-arm circuit disposed on the second path and connected in series with the first series-arm circuit; and the first band-elimination filter circuit connected between ground and the second path at a node between the first and second series-arm circuits.

17. The radio frequency module according to claim 16, wherein the first band-elimination filter circuit includes an inductor, a capacitor, and a switch connected in series with each other between ground and the node.

* * * * *